United States Patent
Yamauchi et al.

(10) Patent No.: US 8,730,139 B2
(45) Date of Patent: May 20, 2014

(54) IMAGE DISPLAY APPARATUS EMPLOYING LASER BEAM SOURCE AND IMAGE DISPLAY METHOD THEREFOR

(75) Inventors: Taisuke Yamauchi, Matsumoto (JP); Takashi Takeda, Suwa (JP); Masayuki Takagi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 991 days.

(21) Appl. No.: 12/358,710

(22) Filed: Jan. 23, 2009

(65) Prior Publication Data

US 2009/0213052 A1  Aug. 27, 2009

(30) Foreign Application Priority Data

Feb. 26, 2008  (JP) .................................. 2008-043951

(51) Int. Cl.
*G09G 3/36*  (2006.01)
(52) U.S. Cl.
USPC .......................................................... 345/87
(58) Field of Classification Search
None
See application file for complete search history.

(56) References Cited

U.S. PATENT DOCUMENTS

| | | | | |
|---|---|---|---|---|
| 2006/0192766 A1 * | 8/2006 | Nakamura et al. | ............ | 345/173 |
| 2007/0159429 A1 * | 7/2007 | Hiroki | .............. | 345/87 |
| 2007/0252795 A1 * | 11/2007 | Shiomi | ........................... | 345/87 |
| 2007/0279353 A1 * | 12/2007 | Oomura | ........................ | 345/87 |
| 2009/0096729 A1 * | 4/2009 | Ozawa et al. | ................... | 345/87 |

FOREIGN PATENT DOCUMENTS

JP   A 6-208089   7/1994

* cited by examiner

*Primary Examiner* — Joseph Haley
*Assistant Examiner* — Emily Frank
(74) *Attorney, Agent, or Firm* — Oliff PLC

(57) ABSTRACT

An image display apparatus employing a laser beam source includes: a light modulating unit that modulates a laser beam emitted from the laser beam source into image light representing an image; and a driving-signal generating unit that generates, on the basis of an image signal of a frame image updated at a fixed first period, a driving signal for driving the light modulating unit. The driving-signal generating unit periodically inserts a noise image in the driving signal while maintaining timing for updating display of the frame image at the first period.

11 Claims, 21 Drawing Sheets

FIRST EMBODIMENT

FIRST EMBODIMENT

FIRST EMBODIMENT

FIRST EMBODIMENT $y = t + x(1-t)$ y: ACTUAL LUMINANCE (%)
x: RANDOM NOISE MAXIMUM APERTURE RATIO (%)
t: DISPLAY RATIO OF RANDOM NOISE (%)

WHEN y=0.9
$0.9 = t + x(1-t)$
$x = (0.9 - t)/(1 - t)$

SECOND EMBODIMENT

FOURTH EMBODIMENT
FIG. 18A
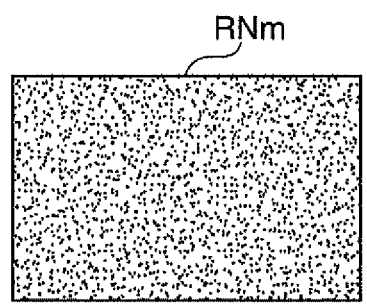
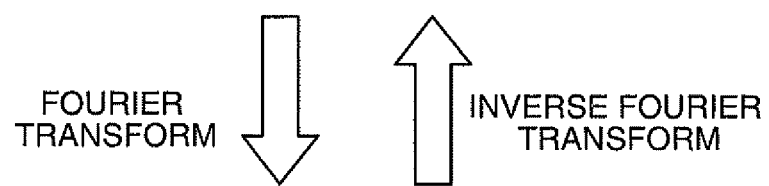
FIG. 18B
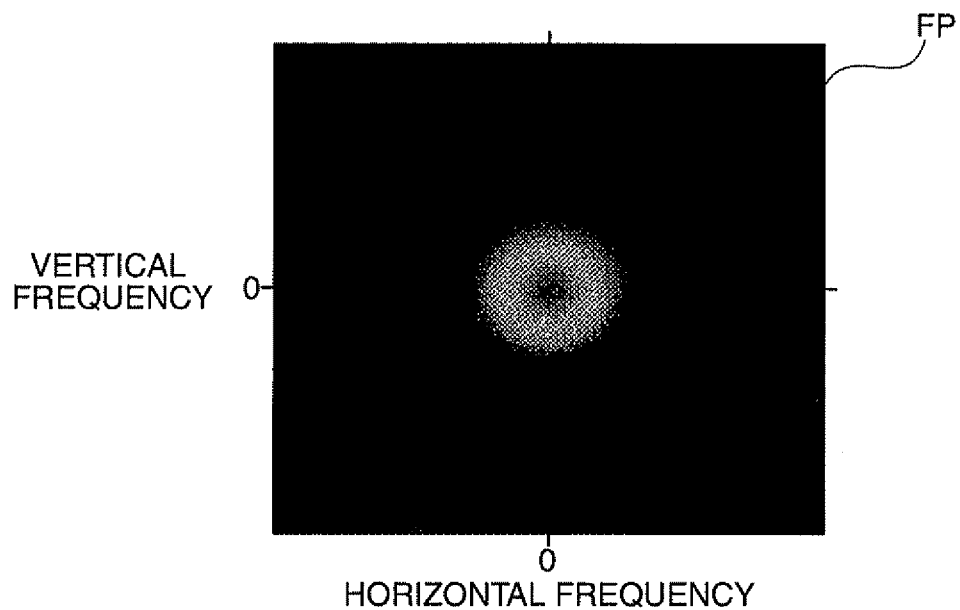

FIFTH EMBODIMENT

COMPARATIVE EXAMPLE

IMAGE DISPLAY APPARATUS EMPLOYING LASER BEAM SOURCE AND IMAGE DISPLAY METHOD THEREFOR

BACKGROUND

1. Technical Field

The present invention relates to an image display apparatus employing a laser beam source.

2. Related Art

There is known an image display apparatus that modulates, on the basis of an image signal, a laser beam emitted from a light source device and projects the laser beam onto a display screen such as a viewing screen (see, for example, JP-A-6-208089).

However, in such an image display apparatus, when the laser beam is, for example, scattered in an optical element provided on an optical path, a random interference pattern (speckle pattern) may appear in a display image because coherence of the laser beam is high. When the speckle pattern appears, an observer of the display image feels a flicker in the display image and recognizes that the display image is unclear. Sufficient measures have not been actually taken against such a problem.

SUMMARY

An advantage of some aspects of the invention is to provide a technique that can reduce the influence of a speckle pattern on a display image in an image display apparatus employing a laser beam source.

According to an aspect of the invention, there is provided an image display apparatus employing a laser beam source, the image display apparatus including:

a light modulating unit that modulates a laser beam emitted from the laser beam source into image light representing an image; and a driving-signal generating unit that generates, on the basis of an image signal of a frame image updated at a fixed first period, a driving signal for driving the light modulating unit, wherein the driving-signal generating unit periodically inserts a noise image in the driving signal while maintaining timing for updating display of the frame image at the first period.

With the image display apparatus, it is possible to cause complex amplitude on the display screen to fluctuate by displaying the noise image inserted in the driving signal on the display screen. Therefore, even when a speckle pattern due to the laser beam source appears, it is possible to reduce the influence of the speckle pattern on a display image through the fluctuation in the complex amplitude.

It is preferable that the noise image periodically inserted in the driving signal is a random noise image that is a uniform image in which a specific pattern does not appear when a plurality of the noise images are integrated in a time direction.

With the image display apparatus, it is possible to prevent an observer of the display image from recognizing a noise pattern inserted in the display image.

It is preferable that the driving-signal generating unit generates, at the first period, a frame-image driving signal for displaying the frame image as a non-noise frame image not including the noise image and generates, at a fixed second period, a noise-image driving signal for displaying the noise image.

With the image display apparatus, the frame images representing a moving image are displayed at the fixed first period and the noise image is inserted between the frame images and displayed at the fixed second period. Therefore, it is possible to display, while displaying the frame images at a period at which the observer of the display image can recognize the moving image (the first period), a noise frame image at a period at which the observer of the display image is prevented from recognizing the noise image (the second period). Consequently, it is possible to reduce the influence of the speckle pattern on the display image and prevent the observer of the display image from recognizing the noise pattern inserted in the display image.

It is preferable that the driving-signal generating unit further generates, as the non-noise frame image not including the noise image, a predicted frame image predicted as an image present in the middle of each pair of the frame images arranged in time series order and generates, at the first period, a predicted-frame-image driving signal for displaying the predicted frame image.

With the image display apparatus, since the predicted frame image is inserted, the observer of the display image can more smoothly sense a motion represented by the moving image.

It is preferable that the second period is equal to the first period.

With the image display apparatus, it is possible to more effectively reduce the influence of the speckle pattern on the display image.

It is preferable that an average luminance level of the noise image is set in association with an average luminance level of a predetermined number of the non-noise frame images displayed before the noise image.

With the image display apparatus, it is possible to prevent the average luminance level of the non-noise frame images and the average luminance level of the noise image displayed following the non-noise frame images from becoming extremely different from each other. Therefore, it is possible to prevent the observer of the display image from recognizing the influence of the insertion of the noise image on an average luminance level of the display image.

It is preferable that the noise image is an image that has, when subjected to Fourier transform, amplitude intensity in a first frequency band near 0 of a frequency lower than amplitude intensity in a second frequency band further on a high-frequency side than the first frequency band.

With the image display apparatus, since the noise image including high-frequency components larger in number than low-frequency components are inserted, it is possible to cause complex amplitude on a focal plane of a laser beam to more substantially fluctuate. Therefore, it is possible to further reduce the influence of the speckle pattern on the display image.

It is preferable that all the noise images displayed at least within one second are different.

With the image display apparatus, it is possible to further prevent the observer of the display image from recognizing the inserted noise image It is preferable that the driving-signal generating unit generates, at the first period, a frame-image-with-noise driving signal for displaying a frame image with noise obtained by combining the frame image and the noise image.

With the image display apparatus, since the noise image is displayed simultaneously with the frame image, it is possible to reduce the influence of the speckle pattern on the display image. It is also possible to set a frame period smaller than that for alternately displaying the noise image and the frame image.

It is preferable that the driving-signal generating unit further generates a predicted frame image predicted as an image present in the middle of each pair of the frame images arranged in time series order, generates a predicted frame image with noise obtained by combining the predicted frame image with the noise image, and generates, at the first period, a predicted-frame-image-with-noise driving signal for displaying the predicted frame image with noise.

With the image display apparatus, it is possible to cause, through the generation of the predicted frame with noise, the observer of the display image to more smoothly sense the motion represented by the moving image. It is also possible to reduce the influence of the speckle pattern on the display image.

The invention can be embodies in various forms. For example, the invention can be embodied in forms such as an image display method and an image display apparatus employing a laser beam source, a control method for the image display apparatus and a control apparatus for the image display apparatus, a computer program for realizing functions of the methods or the apparatuses, and a recording medium having recorded therein the computer program.

BRIEF DESCRIPTION OF THE DRAWINGS

The invention will be described with reference to the accompanying drawings, wherein like numbers reference like elements.

FIGS. 18A and 18B are diagrams for explaining a random noise image and a two-dimensional Fourier pattern thereof according to a fourth embodiment of the invention.

DESCRIPTION OF EXEMPLARY EMBODIMENTS

Exemplary embodiments of the invention are explained in detail below with reference to the accompanying drawings.

First Embodiment

Figure 1:
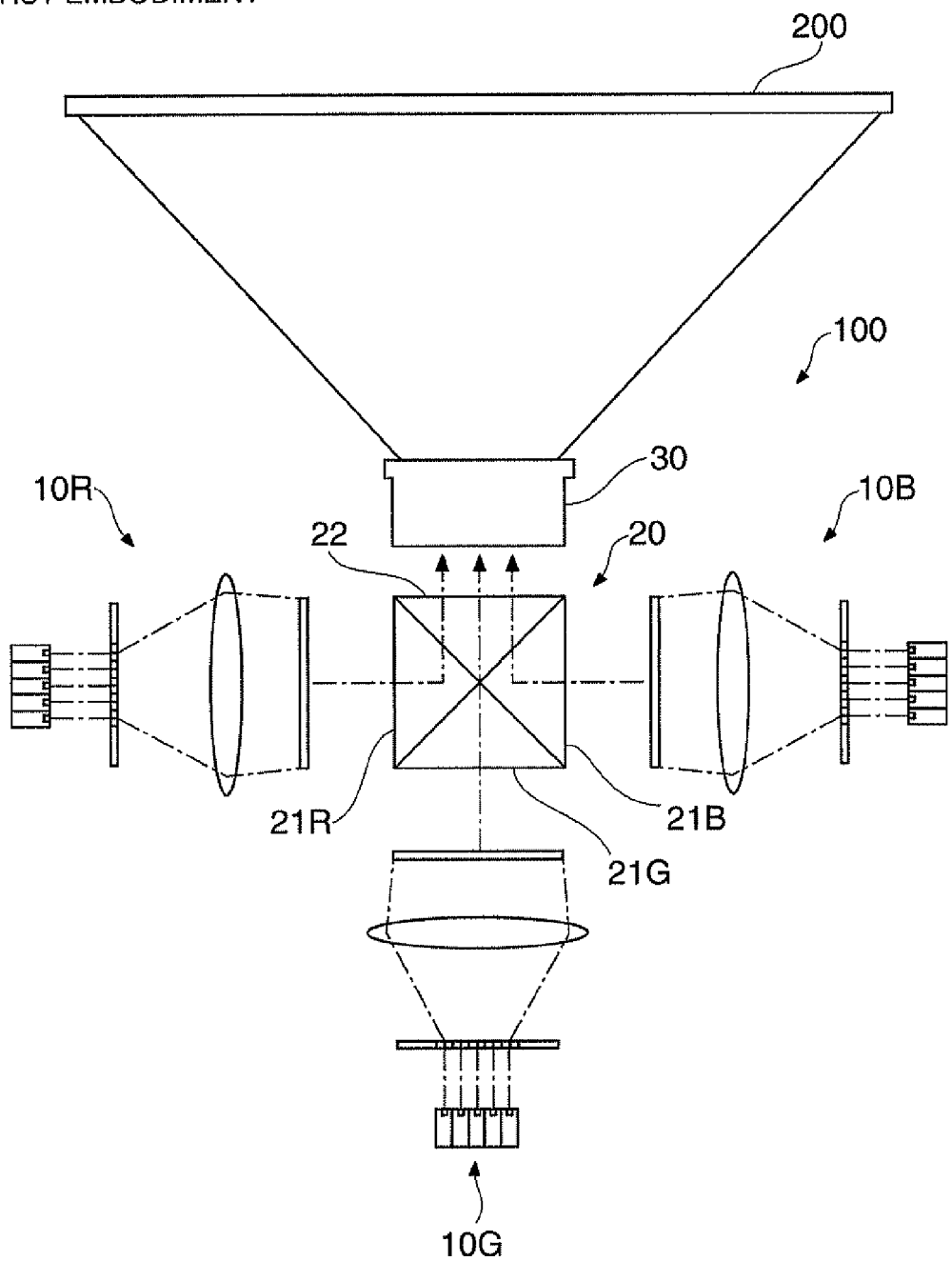
FIG. 1 is a schematic diagram of a configuration of an image display apparatus according to a first embodiment of the invention.

FIG. 1 is a schematic diagram of a configuration of an image display apparatus 100 according to a first embodiment of the invention. This image display apparatus 100 is a projection display apparatus that projects image light modulated according to an image signal representing an image onto a projection screen 200 and displays a color image thereon.

The image display apparatus 100 includes three image-light emitting devices 10R, 10G, and 10B, a cross dichroic prism 20, and a projection lens 30. The three image-light emitting devices 10R, 10G, and 10B respectively emit image lights for color components of three colors of red, green, and blue. The "image light" means light representing an image obtained by modulating light from a light source on the basis of an image signal explained later. The image lights for the color components emitted from the image-light emitting devices 10R, 10G, and 10B are respectively made incident on planes of incidence 21R, 21G, and 21B of the cross dichroic prism 20. The image lights for the color components are combined in the cross dichroic prisms 20 and emitted from a plane of emission 22. The combined image light is magnified by the projection lens 30 and projected onto the projection screen 200.

Figure 2A:
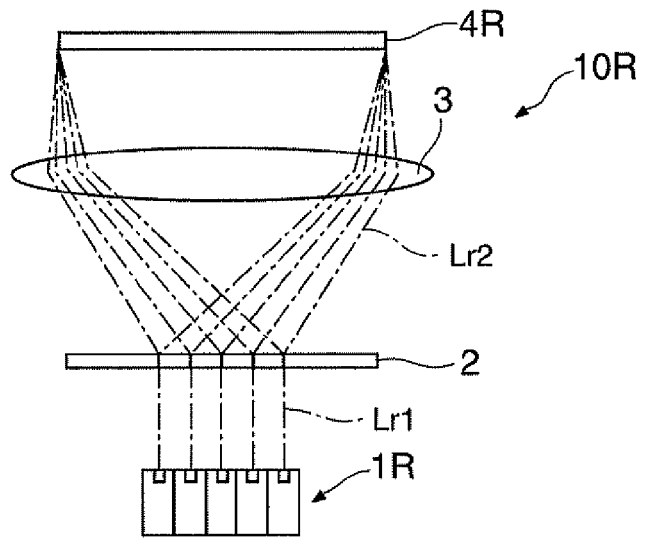
FIGS. 2A and 2B are schematic diagrams of a configuration of an image light emitting device according to the first embodiment.
Figure 2B:
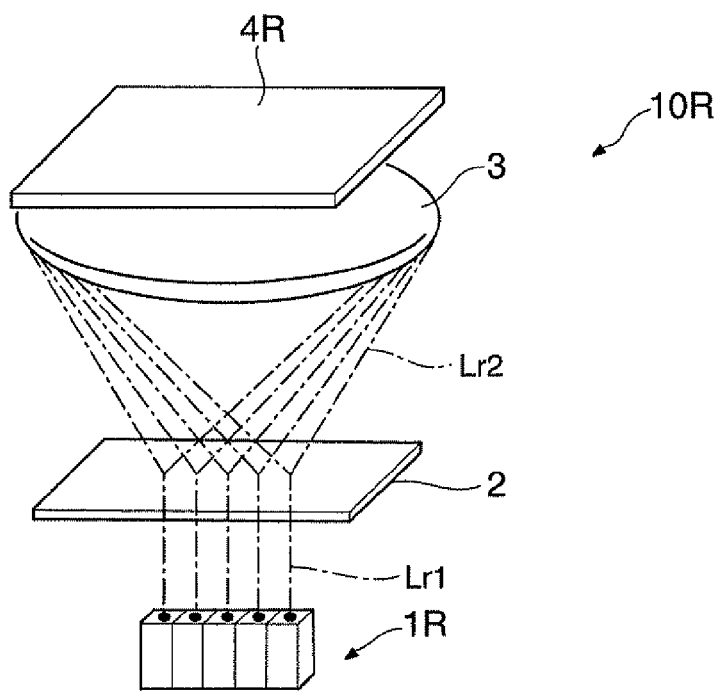

FIG. 2A is a schematic diagram of a configuration of the red-component image-light emitting device 10R that emits the image light for the red component. FIG. 2B is a perspective view corresponding to FIG. 2A. The other color-component image-light emitting devices 10G and 10B have configurations same as that of the red-component image-light emitting device 10R. Therefore, illustration and explanation of the other color-component image-light emitting devices 10G and 10B are omitted. The red-component image-light emitting device 10R includes a laser-array light source device 1R that emits a red laser beam, a diffractive optical element 2, a field lens 3, and a liquid crystal panel 4R for red component light. The laser-array light source device 1R emits plural parallel red laser beams Lr1 arranged at equal intervals to the diffractive optical element 2. The diffractive optical element 2 emits diffractive lights Lr2 obtained by diffusing the laser beams Lr1. The diffractive lights Lr2 are made incident on a lens surface of the field lens 3 and diffracted by the field lens 3 to light predetermined lighting areas (explained later) of the liquid crystal panel 4R for red component light in a superimposing manner and uniformly.

Figure 3:
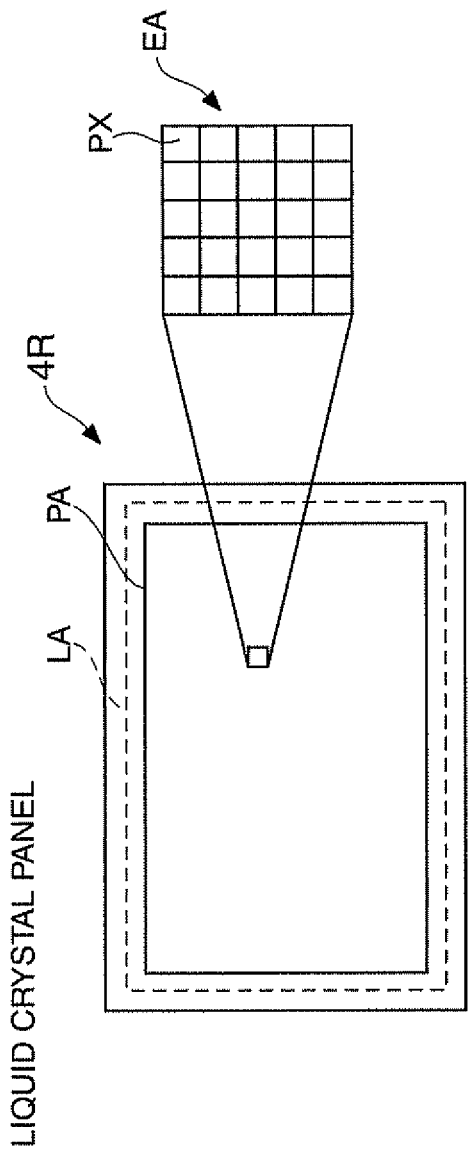
FIG. 3 is a schematic diagram of a configuration of a liquid crystal panel according to the first embodiment.

FIG. 3 is a schematic diagram of a configuration of the liquid crystal panel 4R for red component light. A plane of incidence side of the diffractive light Lr2 is shown in the figure. Liquid crystal panels 4G and 4B for the other color component lights have configurations same as that of the liquid crystal panel 4R for red component light. Therefore, illustration and explanation of the liquid crystal panels 4G and 4B are omitted. The liquid crystal panel 4R has lighting area LA lighted by the diffractive light Lr2 (FIGS. 2A and 2B). The lighting area LA has a pixel area PA of a rectangular shape in which plural rectangular pixels PX are arrayed crosswise and lengthwise. In the figure, a partial area EA (an area equivalent to twenty-five pixels (5×5 pixels) including arbitrary twenty-five pixels of the pixel area PA is enlarged and shown. The pixels PX modulate, on the basis of a modulation signal (also referred to as "driving signal") explained later, light made incident thereon.

Figure 4:
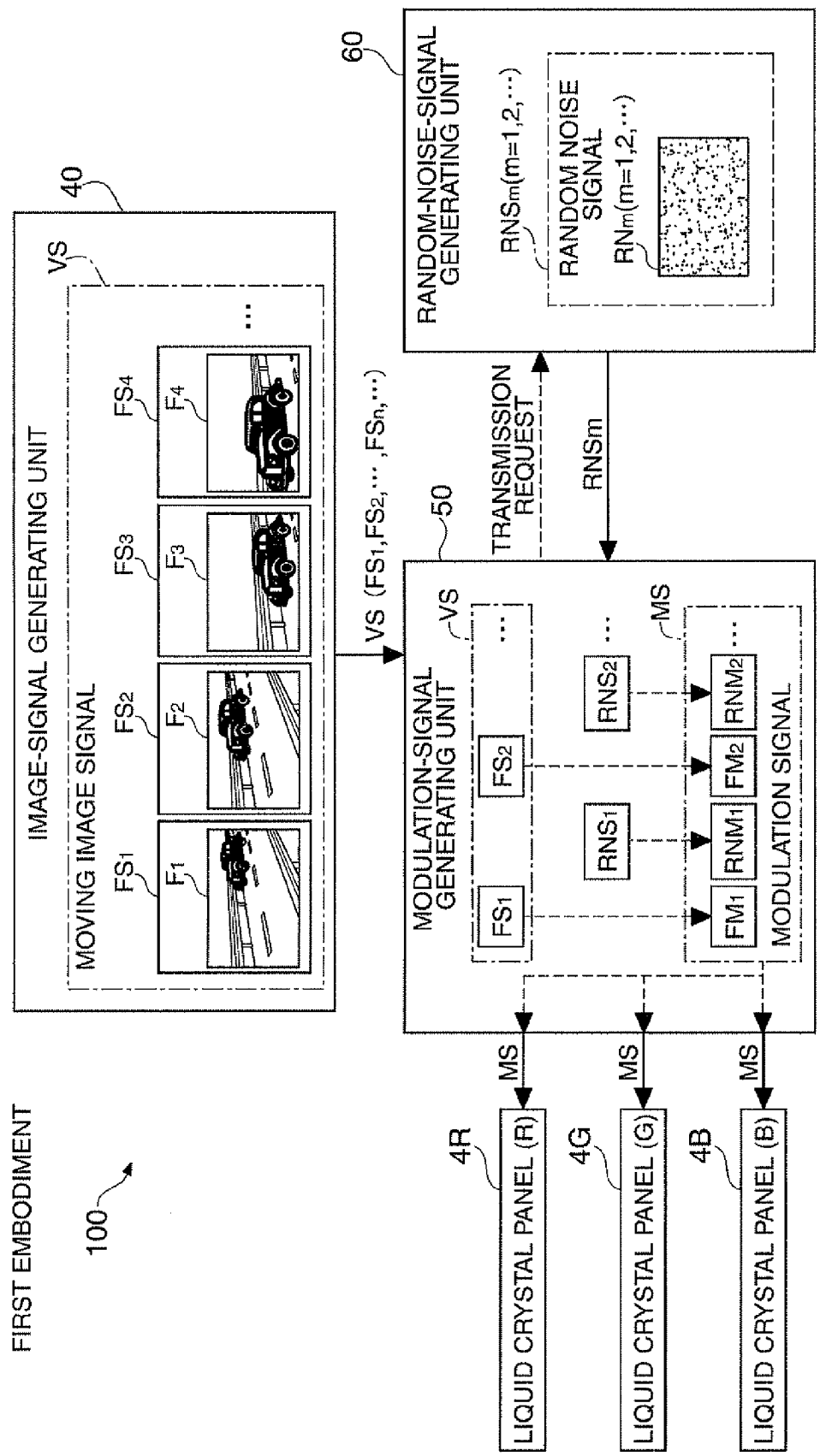
FIG. 4 is a schematic diagram of an internal configuration of the image display apparatus according to the first embodiment.

FIG. 4 is a schematic diagram of an internal configuration of the image display apparatus 100. The image display apparatus 100 includes an image-signal generating unit 40, a modulation-signal generating unit 50, and a random-noise-signal generating unit 60. The image-signal generating unit 40 transmits a moving image signal VS representing a moving image to the modulation-signal generating unit 50. The moving image signal VS is a digital signal including frame image signals $FS_n$ representing frame images $F_n$ updated at a predetermined frame period. The suffix "n" of the frame images $F_n$ is a natural number and represents display order of each of the frame images.

When the modulation-signal generating unit 50 receives the moving image signal VS, the modulation-signal generating unit 50 starts generation of a driving signal MS (a modulation signal MS) for controlling modulation operations of the liquid crystal panels 4R, 4G, and 4B for the color component lights. Specifically, every time the modulation-signal generating unit 50 receives each of the frame image signals $FS_n$ included in the moving image signal VS, the modulation-signal generating unit 50 sequentially generates a frame image modulation signal $FM_n$ for reproducing the frame images $F_n$. Every time the modulation-signal generating unit 50 generates the frame image modulation signal $FM_n$, the modulation-signal generating unit 50 issues a transmission request for a random noise signal $RNS_m$ to the random-noise-signal generating unit 60.

The random-noise-signal generating unit 60 transmits, according to the request from the modulation-signal generating unit 50, the random noise signal $RNS_m$ representing a noise image $RN_m$ having a random noise pattern (hereinafter referred to as "random noise image $RN_m$") to the modulation-signal generating unit 50. The "random noise pattern" means a noise pattern with which a substantially uniform image without appearance of a specific pattern is obtained when display images obtained by temporally continuously displaying plural noise patterns are integrated in a time direction. The suffix "m" of the random noise image $RN_m$ and the random noise signal $RNS_m$ is a natural number and represents order of transmission to the modulation-signal generating unit 50.

Figure 5:
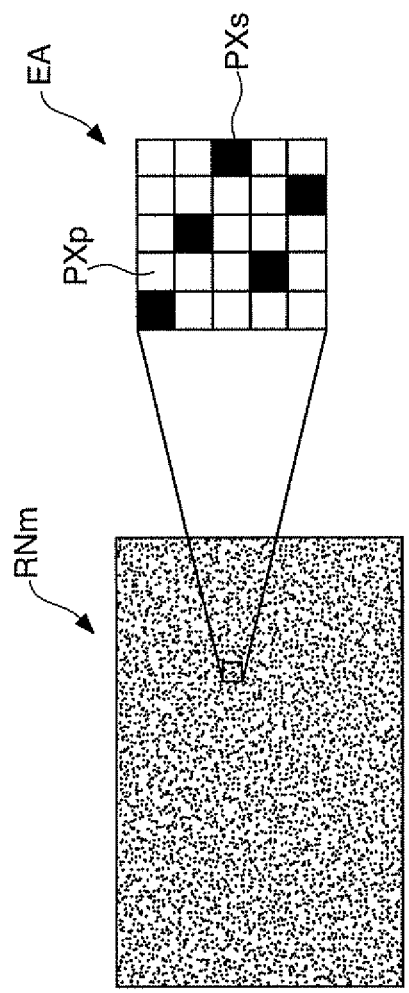
FIG. 5 is a diagram for explaining a random noise image.

FIG. 5 is a schematic diagram of a specific example of the random noise image $RN_m$. Like the pixel area PA shown in FIG. 3, the partial area EA of the random noise image $RN_m$ is enlarged and shown. In the random noise image $RN_m$, a noise pattern is formed by distributing, at random, light transmitting pixels PXp that generally transmit light and light blocking pixels PXs that generally block light. The random noise image $RN_m$ may be generated by the random-noise-signal generating unit 60 or may be stored in a storing unit (not shown) of the image display apparatus 100 in advance.

In this specification, a ratio of the number of the light transmitting pixels PXp to the number of all pixels of the random noise image $RN_m$ is referred to as an "aperture ratio". In this embodiment, a random noise image having the aperture ratio of about 80% is used as the random noise image $RN_m$. A reason for this is explained later.

When the modulation-signal generating unit 50 (FIG. 4) receives the random noise signal $RNS_m$, the modulation-signal generating unit 50 generates a random noise modulation signal $RNM_m$ for reproducing the random noise images $RN_m$. The modulation-signal generating unit 50 transmits the random noise modulation signal $RNM_m$ to the liquid crystal panels 4R, 4G, and 4B as the modulation signal MS after transmitting the frame image modulation signal $FM_n$. As the modulation signal MS generated by the modulation-signal generating unit 50, the frame image modulation signal $FM_n$ and the random noise modulation signal $RNM_m$ are alternately generated.

Figure 6:
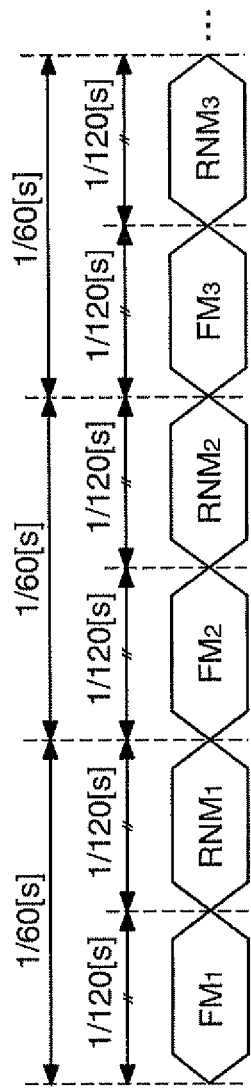
FIG. 6 is a diagram of an example of a timing chart for a modulation signal according to the first embodiment.

FIG. 6 is a diagram for explaining an example of a timing chart for the modulation signal MS. The modulation-signal generating unit 50 adjusts display times by the frame image modulation signal $FM_n$ and the random noise modulation signal $RNM_m$ such that a period of update timing for the frame images $F_n$ is maintained at a fixed frame period. The "update timing" means display start time for a new display image. In this embodiment, both the image display times by the frame image modulation signal $FM_n$ and the random noise modulation signal $RNM_m$ are about 1/120 seconds. The period of the update timing for the frame images $F_n$ is maintained at 1/60 second, which is a frame period in the moving image signal VS.

Figure 7:
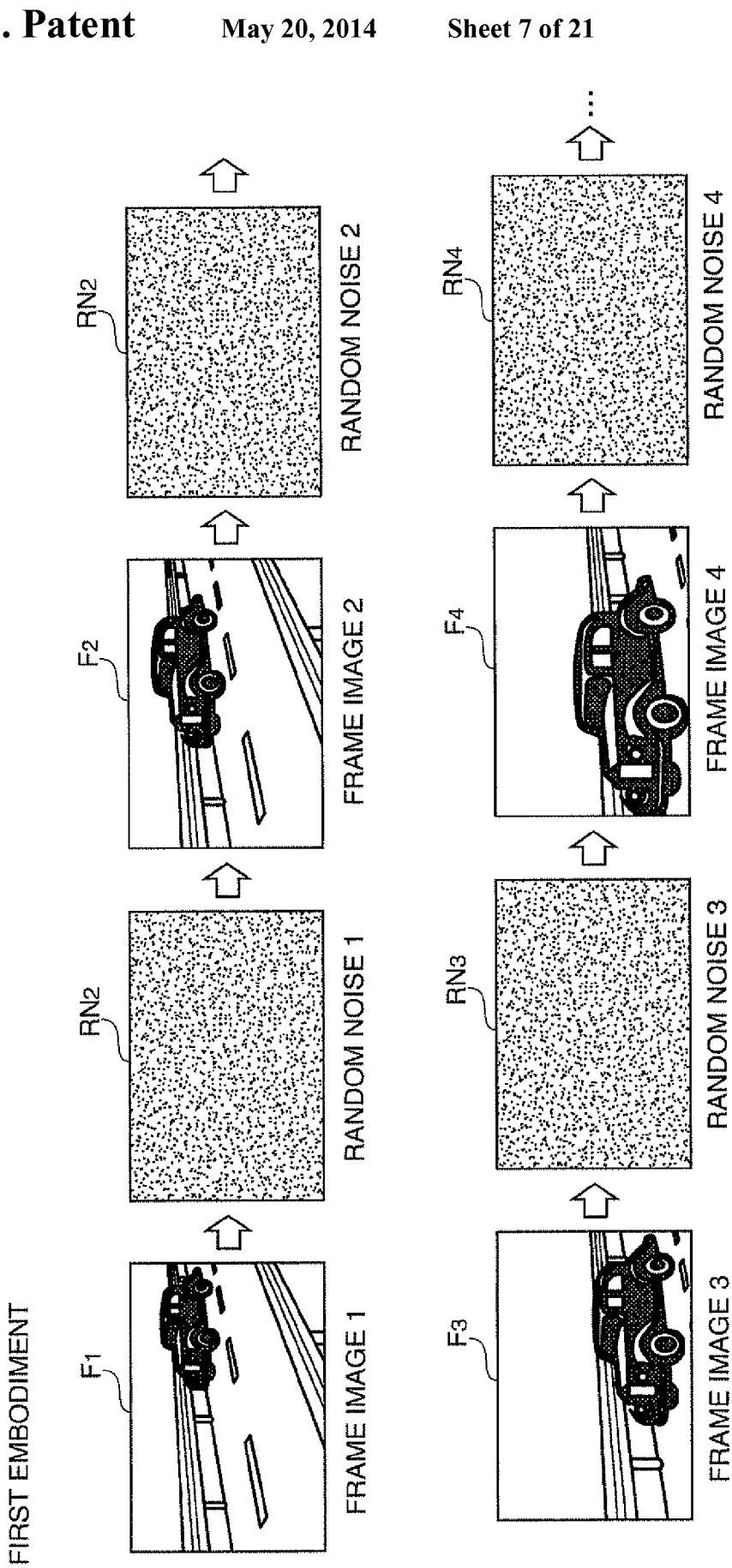
FIG. 7 is a schematic diagram for explaining display images shown in time series according to the first embodiment.

FIG. 7 is a schematic diagram for explaining display images arranged in time series. The display images are projected on the projection screen 200 as a result of the liquid crystal panels 4R, 4G, and 4B for the color component lights executing a modulation operation according to the modulation signal MS. In this way, the frame images $F_n$ and the random noise images $RN_m$ are alternately updated and displayed about every 1/120 second according to the modulation signal MS (FIG. 6).

When the laser beam is used as the light source as in the image display apparatus 100, since the laser beam has high coherence, a random interference pattern (speckle pattern) may appear if the laser beam is diffused by the optical element arranged in the optical path. When the speckle pattern appears, an observer of a display image may sense a flicker in the display image and recognize that the display image is unclear. However, when the random noise images RNm are intermittently inserted among the frame images $F_n$ forming the moving image as in this embodiment, even when the speckle pattern appears, it is possible to prevent the observer of the display image from recognizing the influence of the speckle pattern on the display image. A reason for this is explained below.

Figure 8:
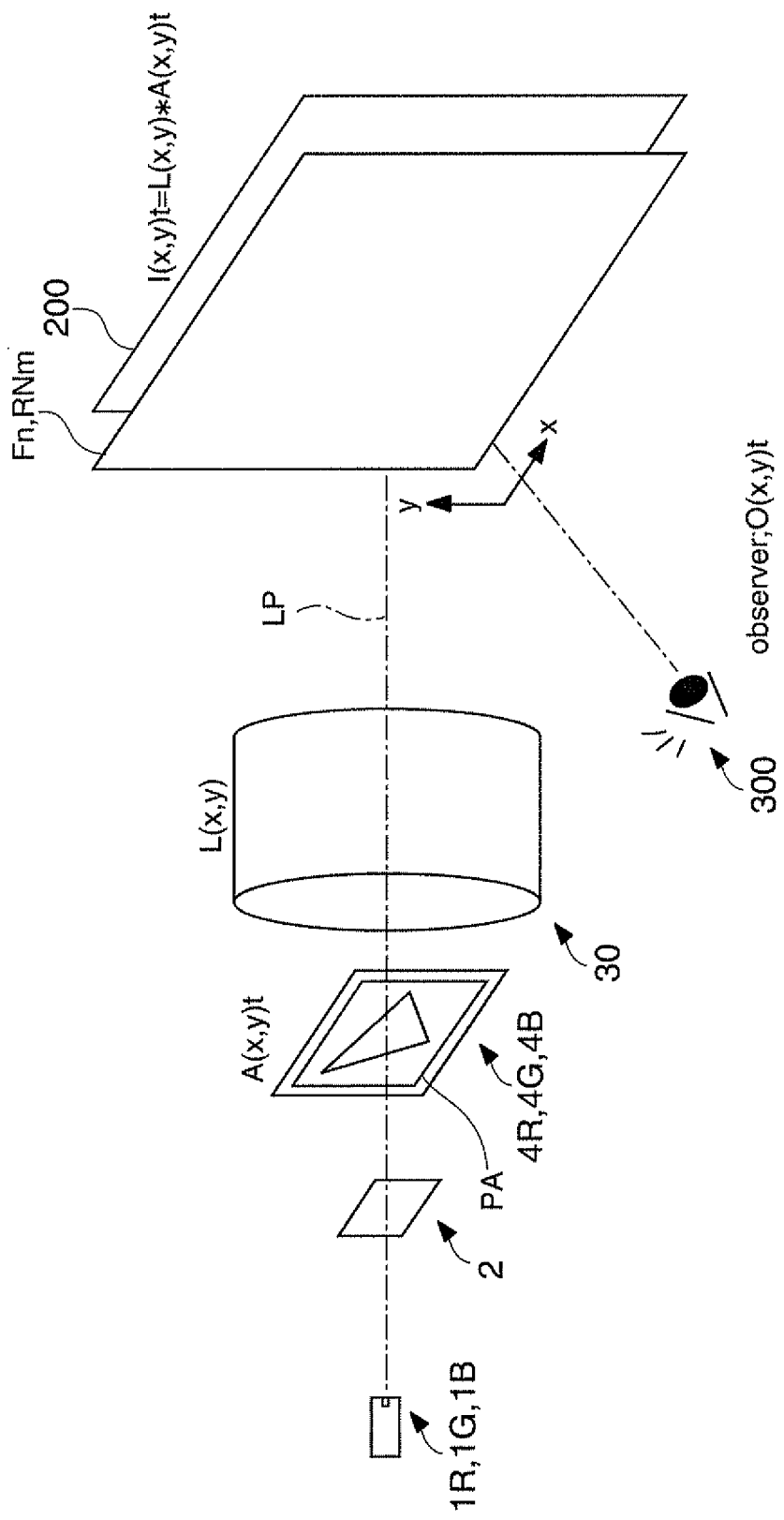
FIG. 8 is a schematic diagram for explaining an optical path of a laser beam in the image display apparatus.

FIG. 8 is a schematic diagram in which, for convenience of illustration, optical paths of laser beams of the color components of the image display apparatus 100 are shown as one linear optical path LP. In the figure, the cross dichroic prism 20 (FIG. 1) and the field lens 3 (FIGS. 2A and 2B) are not shown. For convenience of illustration, the projection screen 200 and the display images $F_n$ and $RN_m$ are shown apart from each other.

The laser beam emitted from the laser-array light source devices 1R, 1G, and 1B is projected on the projection screen 200 after being diffused and modulated via the diffractive optical element 2, the liquid crystal panels 4R, 4G, and 4B, and the projection lens 30 and observed by an observer 300 as the display images $F_n$ and $RN_m$. The complex amplitude of light in the pixel area PA of the liquid crystal panels 4R, 4G, and 4B at time "t" is represented as $A(x, y)_t$. A transmission function of the projection lens 30 is represented as $L(x, y)$. "x" and "y" indicate coordinates in the images, respectively (arrows in the figure). Complex amplitude $I(x, y)_t$ of the display images $F_n$ and $RN_m$ on the projection screen 200 at the time "t" is represented by the following Formula (1). A sign "*" indicates a convolutional integral.

$$I(x,y)_t = L(x,y) * A(x,y)_t \quad (1)$$

From Formula (1), intensity $O(x, y)_t$ of light of the images recognized by the observer 300 at time "t" can be obtained as a square of an absolute value of the complex amplitude $I(x, y)_t$ (Formula 2).

$$O(x,y)_t = |I(x,y)_t|^2 \quad (2)$$

In the image display apparatus 100, the frame images $F_n$ and the random noise images $RN_m$ are alternately displayed at the period of 1/120 second. When the images are updated over time in this way, intensity $O(x, y)$ of the light of the images recognized by the observer 300 within predetermined time can be approximately obtained by integrating the intensity $O(x, y)_t$ of the light in a time direction. The following Formula (3) indicates a result of the integral. t1 to tk (k is a natural number) indicate update times of the images.

$$O(x,y) = O(x,y)_{t1} + (x,y)_{t2} + \ldots + O(x,y)_{tk} \quad (3)$$

Figure 9:
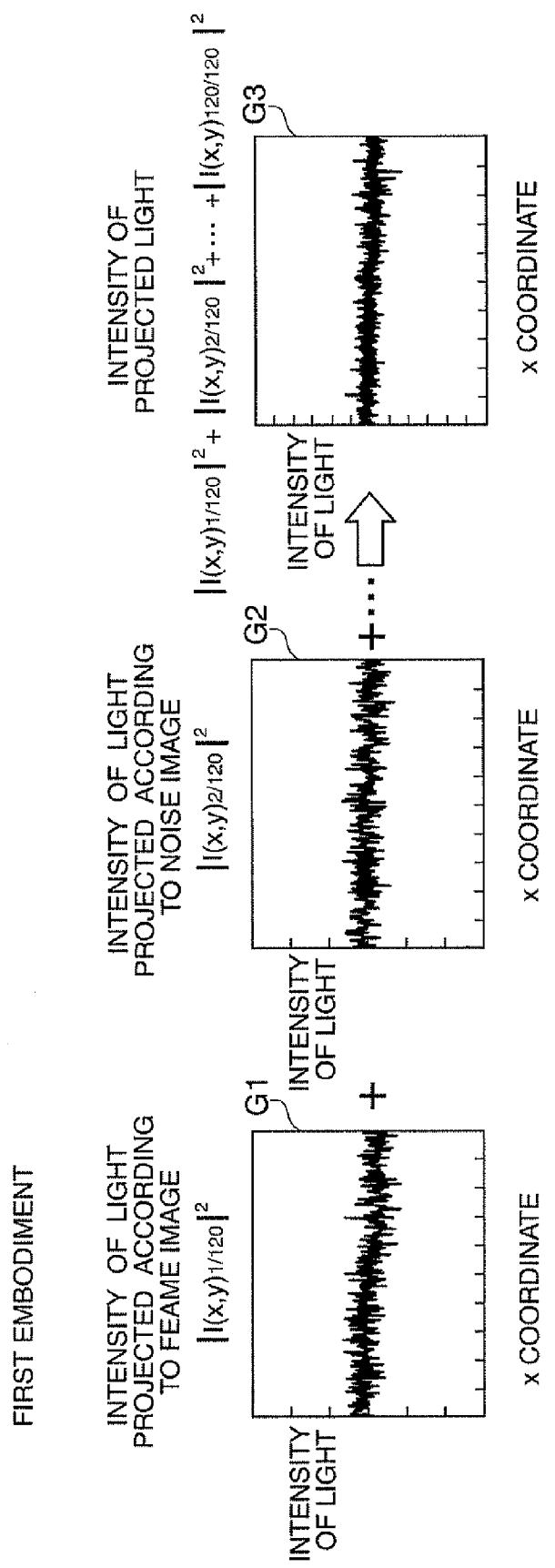
FIG. 9 is a graph for explaining a reduction in the influence of a speckle pattern on a display image.

FIG. 9 is a graph for explaining an effect of suppression of a speckle pattern through the insertion of random noise images in a moving image. Graphs G1, G2, and G3 respectively indicate intensity distributions of light in an X axis direction of the projection screen (FIG. 8). It is assumed that all the frame images $F_n$ displayed in the image display apparatus 100 are totally white images. The first graph G1 indicates an intensity distribution of light of a frame image $F_1$ displayed first. In a totally white display image, an intensity distribution of light should originally be substantially uniform. However, because of appearance of a speckle pattern, nonuniformity of the intensity distribution of light indicated by the first graph G1 occurs. In frame images $F_2$ to $F_n$ displayed following the frame image $F_1$, nonuniformity of intensity distributions of light same as that indicated by the first graph G1 occurs.

The second graph G2 indicates an intensity distribution of light of a random noise image $RN_1$ displayed after the frame image $F_1$. In the random noise image $RN_1$, a random intensity distribution of light different from that in the frame image $F_1$ is obtained according to a random noise pattern to be displayed of the image. In random noise images $RN_2$ to $RN_m$ displayed following the random noise image $RN_1$, intensity distribution of light corresponding to random noise patterns thereof are obtained, respectively.

In the image display apparatus 100 according to this embodiment, since the random noise images $RN_m$ are inserted when images are displayed, an intensity distribution of light on the projection screen 200 changes at random at the period of 1/120 second. This means that complex amplitude on a focal plane temporally changes.

The first and second graphs G1 and G2 can be associated with a first term and a second term on the right side of Formula (3), respectively. In other words, with t1, t2, ..., and tk set to 1/120 second, 2/120 second, ..., and 120/120 second, respectively, the intensity $O(x, y)$ of light recognized by the observer 300 in about one second can be approximately obtained by adding up the intensities $O(x, y)_t$ of light of the display images $F_n$ and $RN_m$ at image update times.

The third graph G3 indicates an intensity distribution of light obtained as a result of adding up the intensities of light. Compared with the first graph G1, it can be confirmed that the nonuniformity of the intensity distribution of light is reduced. In the image display apparatus 100, the speckle pattern is caused to temporally fluctuate by temporally changing the complex amplitude on the focal plane of the laser beam. In this way, the observer of the display image is prevented from recognizing the speckle pattern.

In order to cause the observer of the display image to recognize that a motion represented by the moving image is smooth, it is preferable that sixty or more frame images are displayed at a period same as an original frame period in about one second. Therefore, the image display apparatus 100 maintains the update period for the frame images $F_n$ forming the moving image constant at 1/60 second. Consequently, the recognition of the moving image by the observer of the display image is not prevented by the insertion of the random noise images.

On the other hand, in order to prevent the observer from recognizing the random noise images $RN_m$, it is preferable to insert sixty or more random noise images having noise patterns different from one another in about one second. However, a display period of the random noise images may be set shorter than a display period of frame images. Therefore, a timing chart for the modulation signal MS can be generalized as explained below.

Figure 10:
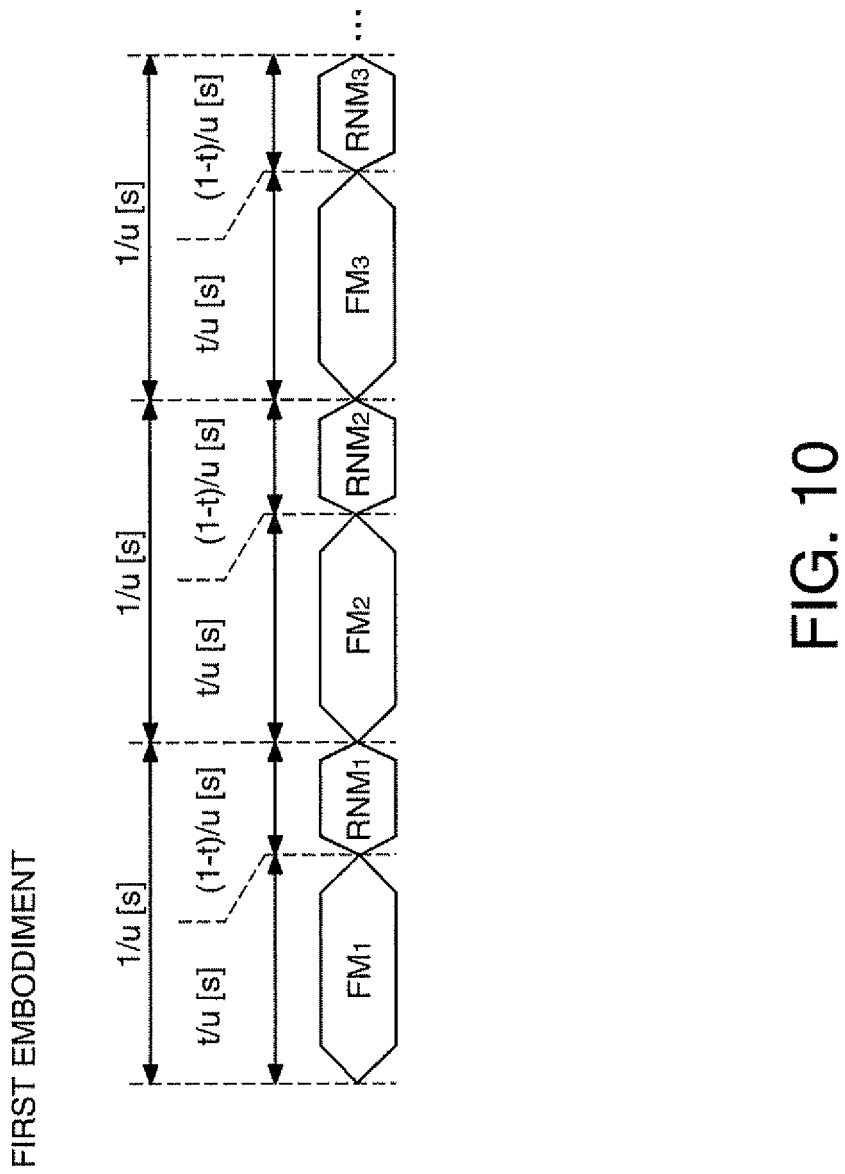
FIG. 10 is a diagram for explaining generalization of the timing chart for the modulation signal according to the first embodiment.

FIG. 10 is a diagram for explaining generalization of the timing chart for the modulation signal MS. FIG. 10 is substantially the same as FIG. 6 except that variables "t" and "u" representing periods of image display by the frame image modulation signal $FM_n$ and the random noise modulation signal $RNM_m$ are used. The variable "t" is an arbitrary real number equal to or larger than 0.5 and the variable "u" is an arbitrary real number equal to or larger than 60. With the generalized modulation signal MS, the frame image modulation signal $FM_n$ is transmitted in t/u second and, subsequently, the random noise modulation signal $RNM_m$ is transmitted in (1−t)/u second. Consequently, the update frequency of the frame images $F_n$ to be displayed is maintained at 1/u second and "u" pieces of the random noise images $RN_m$ different from one another are displayed in one second.

An aperture ratio of the random noise images $RN_m$ is equivalent to average luminance of the entire random noise images $RN_m$. Therefore, effective luminance of the display image changes according to the aperture ratio of the random noise images $RN_m$ to be inserted and display time of the random noise images $RN_m$. The "effective luminance of the display image" means, with respect to temporal average luminance of the entire image in which only the frame images $F_n$ as totally white images are displayed, relative average luminance of the display image in which the random noise images $RN_m$ are inserted.

When the effective luminance of the display image is set extremely low (e.g., about 70%), the observer of the display image senses that the display image is dark. On the other hand, when the effective luminance of the display image is set extremely high (e.g., about 100%), the aperture ratio of the random noise images $RN_m$ is also extremely high and the effect of suppressing the influence of the speckle pattern on the display image decreases. Therefore, the effective luminance of the display image is preferably appropriately maintained at a degree at which a temporal average of the luminance of the display image does not extremely fall and is preferably, for example, about 85% to 95%. In order to maintain such desirable effective luminance, the aperture ratio of the random noise images $RN_m$ can be set by a method explained below.

Figure 11:
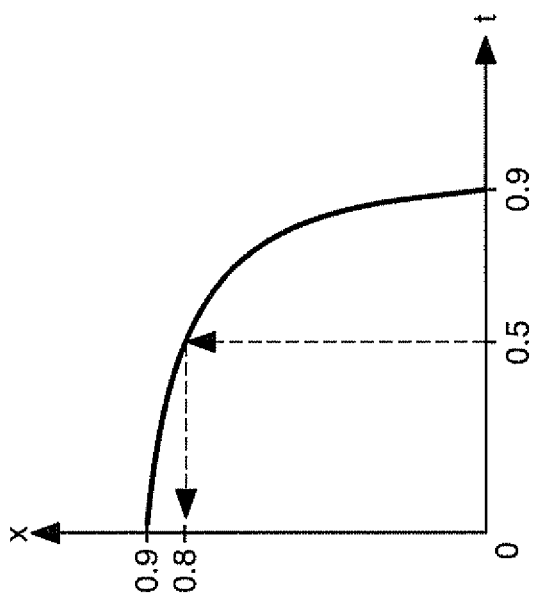
FIG. 11 is a diagram for explaining a method of determining a maximum aperture ratio of random noise images according to the first embodiment.

FIG. 11 is a diagram for explaining an example of a method of determining the aperture ratio of the random noise images $RN_m$. Effective luminance "y" of a display image at the time when the modulation signal MS shown in FIG. 10 is transmitted can be represented by the following Formula (4).

$$y=t+x(1-t) \quad (4)$$

"x" is the aperture ratio of the random noise images $RN_m$. "t" is a display time ratio of the random noise images $RN_m$ to display time of the entire display image and equivalent to "t" explained with reference to FIG. 10.

When the effective luminance "y" of the display image that should be secured in the image display apparatus 100 is set to 90% and substituted in Formula (4) to deform the formula, the following Formula (5) is obtained.

$$x=(0.9-t)/(1-t) \quad (5)$$

From formula (5), a graph shown in FIG. 11 is obtained and an aperture ratio "x" corresponding to the display time ratio "t" of the random noise images $RN_m$ can be determined. For example, in the modulation signal MS explained with reference to FIG. 6, since "t" is 0.5, the effective luminance of the display image can be maintained at about 90% by setting the aperture ratio of the random noise image $RN_m$ to about 80%.

As explained above, in order to prevent the observer of the display image from recognizing the random noise images $RN_m$, it is preferable to form all noise patterns of random noise images displayed in about one second to be different from one another. To set the aperture ratio of the random noise images $RN_m$ to 80% at the maximum, noise patterns only have to be formed at a ratio at which minimum five light blocking pixels PXs are distributed in a partial area including arbitrary twenty-five pixels. There are 53130 ($=_{25}C_5$) arrangement patterns of the light blocking pixels PXs in the partial area including the arbitrary twenty-five pixels. Then, when the display image is updated at about 120 Hz as in this embodiment, the number of the random noise images $RN_m$ to be inserted in about one second is about sixty. Therefore, even if the aperture ratio is set to maximum 80%, it is possible to form all random noise patterns of the random noise images $RN_m$ to be displayed in about one second to be different from one another.

As explained above, with the configuration according to this embodiment, even when a speckle pattern appears in image light, it is possible to prevent, by alternately displaying frame images and noise images, an observer of a display image from recognizing the influence of the speckle pattern on the display image.

Second Embodiment

Figure 12:
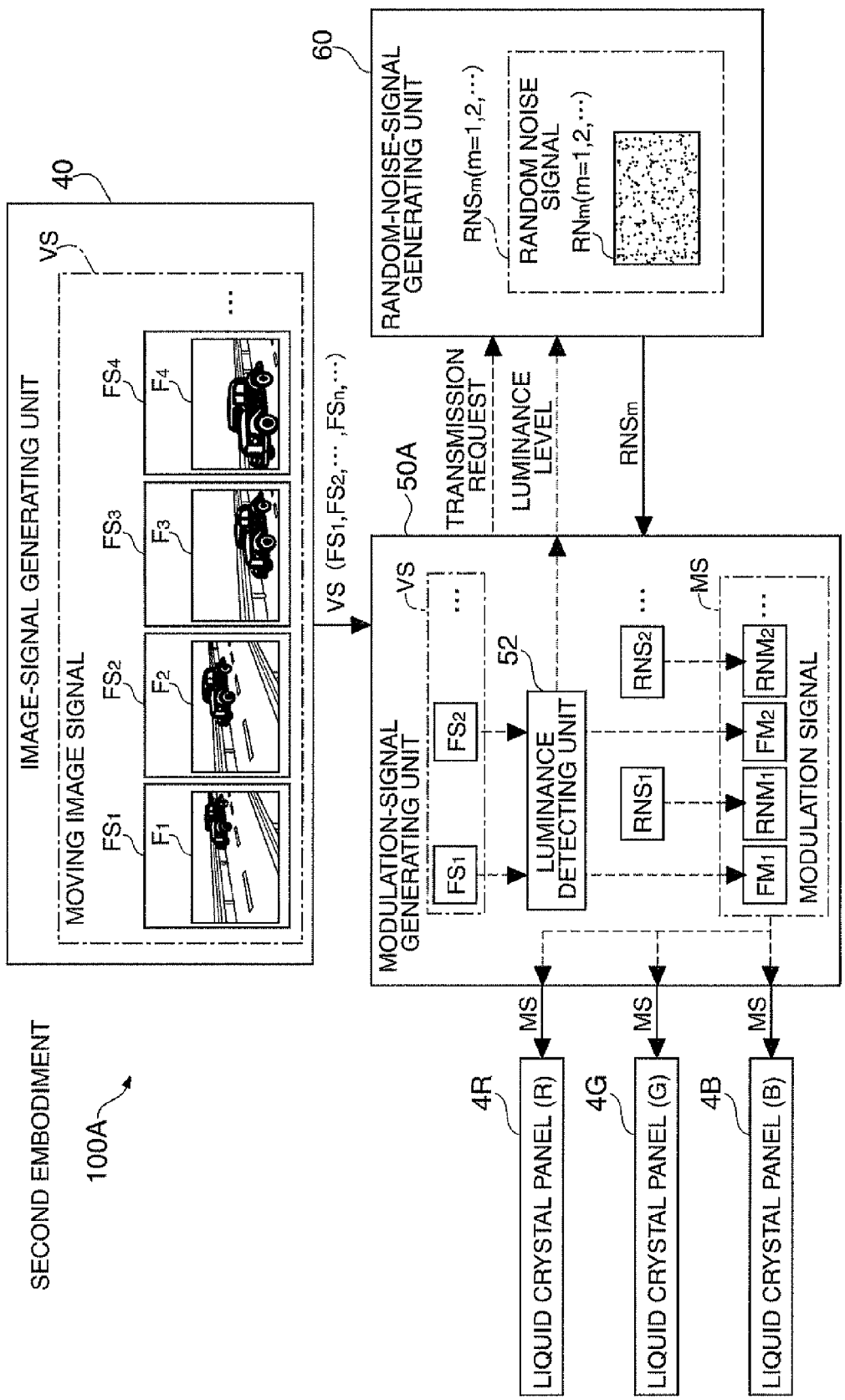
FIG. 12 is a schematic diagram of an internal configuration of an image display apparatus according to a second embodiment of the invention.

FIG. 12 is a schematic diagram of an internal configuration of an image display apparatus 100A according to a second embodiment of the invention. FIG. 12 is substantially the same as FIG. 4 except that a modulation-signal generating unit 50A including a luminance detecting unit 52 is provided instead of the modulation-signal generating unit 50. Other components of the image display apparatus 100A are the same as those in the first embodiment (FIG. 1).

Every time the modulation-signal generating unit 50A receives each of the frame image signals $FS_n$ of the moving image signal VS from the image-signal generating unit 40, the luminance detecting unit 52 calculates an average luminance level of each of the frame images $F_n$ represented by each of the frame image signals $FS_n$. When the modulation-signal generating unit 50A requests the random-noise-signal generating unit 60 to transmit the random noise signal $RNS_m$, the modulation-signal generating unit 50A transmits the calculated average luminance level together with the transmission request. The random-noise-signal generating unit 60 transmits the random noise signal $RNS_m$ of the random noise image $RN_m$ having an aperture ratio corresponding to the received average luminance level to the image-signal generating unit 40.

When an average luminance level of the frame image $F_n$ preceding the random noise image $RN_m$ is represent as "z", the aperture ratio "x" of the random noise image $RN_m$ is determined according to the following Formula (6).

$$x=z*x_o \quad (6)$$

$x_o$ is a fixed value (a maximum aperture ratio) set in advance. The aperture ratio "x" of the random noise image $RN_m$ can be determined by multiplying the average luminance level "z" of the preceding frame image $F_n$ with the predetermined maximum opening ratio $x_o$.

The characteristic shown in FIG. 11 can be considered a characteristic obtained when the average luminance level "z" of the preceding frame image $F_n$ is 1.0 (100%). In this case, the aperture ratio "x" given by the characteristic shown in FIG. 11 is equivalent to the maximum aperture ratio $x_o$ of Formula (6). Therefore, for example, when the display period ratio "t" of frame images is 0.5, it is preferable to set the maximum aperture ratio $x_o$ to 0.8.

Figure 13A:
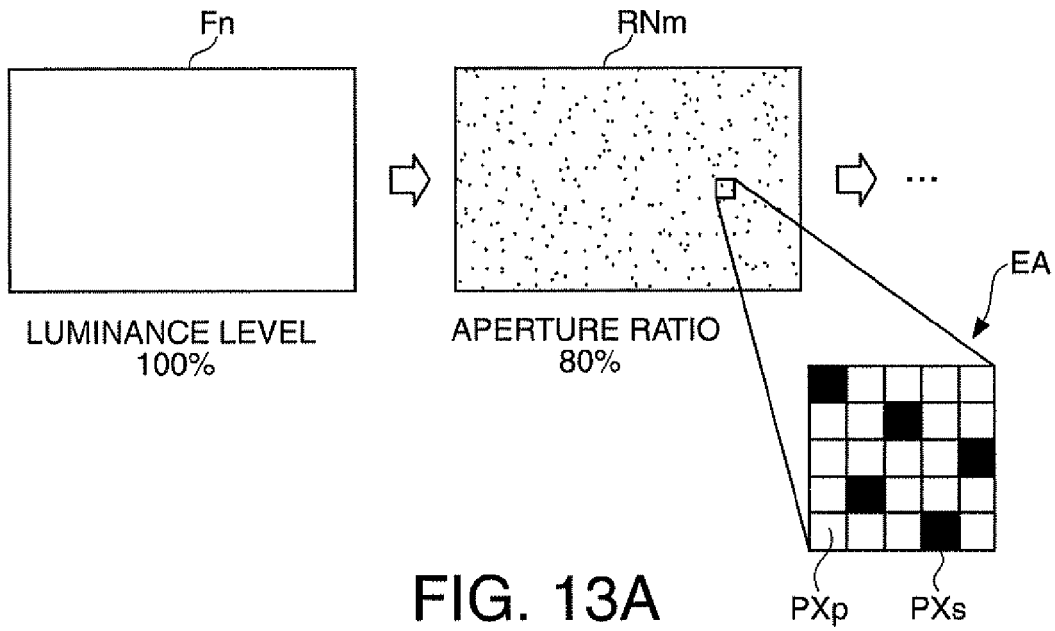
FIGS. 13A and 13B are diagrams for explaining a relation between an average luminance level of a frame image and an aperture ratio of a random noise image according to the second embodiment.
Figure 13B:
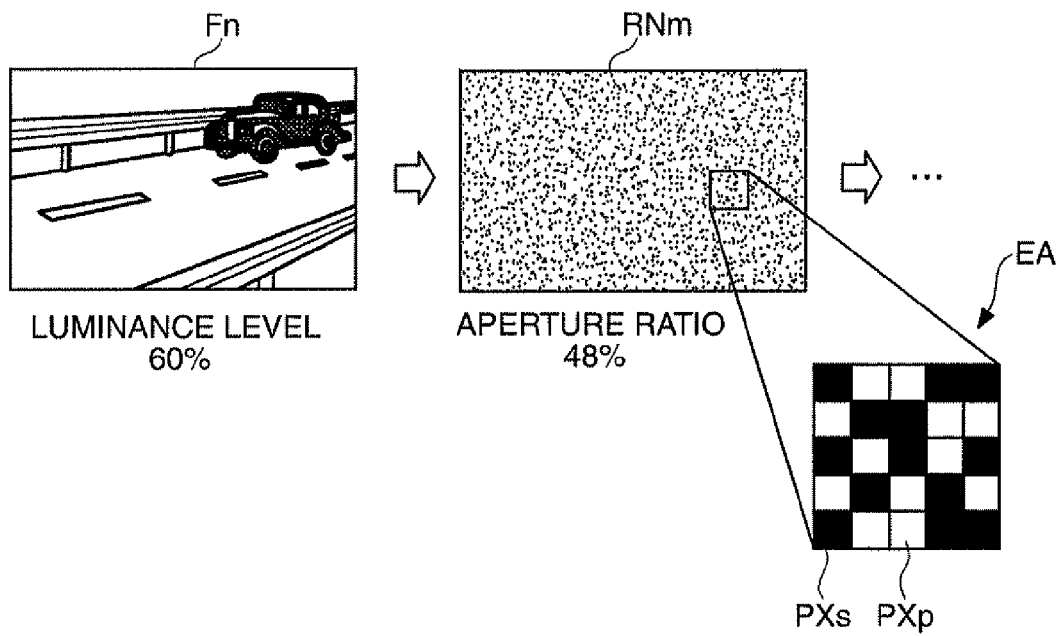

FIGS. 13A and 13B are diagrams for explaining setting of an aperture ratio of the random noise image $RN_m$ corresponding to an average luminance level of each of the frame images $F_n$. As explained above, in this second embodiment, the maximum aperture ratio of the random noise image $RN_m$ is set to 80%. Therefore, when the frame image $F_n$ is a totally white image (a luminance level is 100%), the aperture ratio "x" of the random noise image $RN_m$ displayed following the frame image $F_n$ is 80% of the maximum (FIG. 13A). In FIG. 13A, an arbitrary partial area EA of the random noise image $RN_m$ is enlarged and shown. Five light blocking pixels PXs and twenty light transmitting pixels PXp are included in twenty-five pixels in the partial enlarged area EA.

FIG. 13B is the same as FIG. 13A. In an example shown in FIG. 13B, the random noise image $RN_m$ having an aperture ratio of about 48% is displayed following the frame image $F_n$ having a luminance level of 60%. As the random noise image $RN_m$ to be displayed following the frame image $F_n$ other than a totally white image, the random noise image $RN_m$ having an aperture ratio equivalent to a value obtained by multiplying a luminance level of the frame image $F_n$ with the maximum aperture ratio 80% is displayed.

Since the aperture ratio of the random noise image $RN_m$ is set in association with the luminance level of the frame image $F_n$ displayed immediately preceding the random noise image $RN_m$ in this way, it is possible to prevent a sudden change in a luminance level of a display image formed by the random noise images $RN_m$. Therefore, an observer of the display image is prevented from recognizing deterioration in the display image.

Third Embodiment

Figure 14:
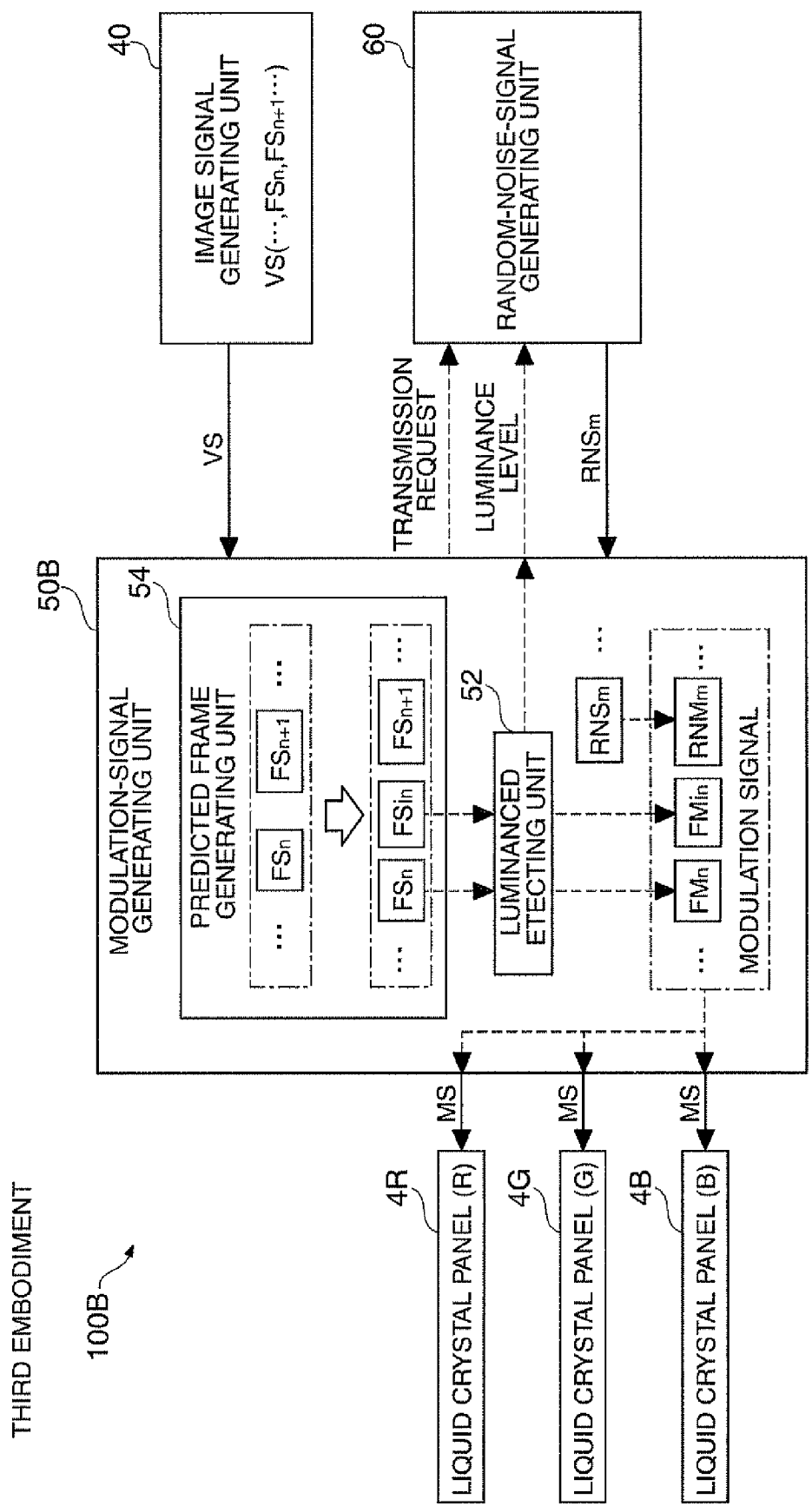
FIG. 14 is a schematic diagram of an internal configuration of an image display apparatus according to a third embodiment of the invention.

FIG. 14 is a schematic diagram of an internal configuration of an image display apparatus 100B according to a third embodiment of the invention. FIG. 14 is substantially the same as FIG. 12 except that a modulation-signal generating unit 50B includes a predicted-frame generating unit 54 and that the illustration of the image-signal generating unit 40 and the random-noise-signal generating unit 60 is simplified. Other components of the image display apparatus 100B are the same as those in the second embodiment (FIG. 1).

When the modulation-signal generating unit 50B receives the moving image signal VS from the image-signal generating unit 40, the modulation-signal generating unit 50B passes the moving image signal VS to the predicted-frame generating unit 54. Every time the predicted-frame generating unit 54 receives a frame image signal $FS_{n+1}$ included in the moving image signal VS, the predicted-frame generating unit 54 generates, on the basis of the frame image signal $FS_{n+1}$ and the frame image signal $FS_n$ received immediately preceding the frame image signal $FS_{n+1}$, a predicted frame image signal $FSi_n$ representing a predicted frame image $Fi_n$.

Figure 15:
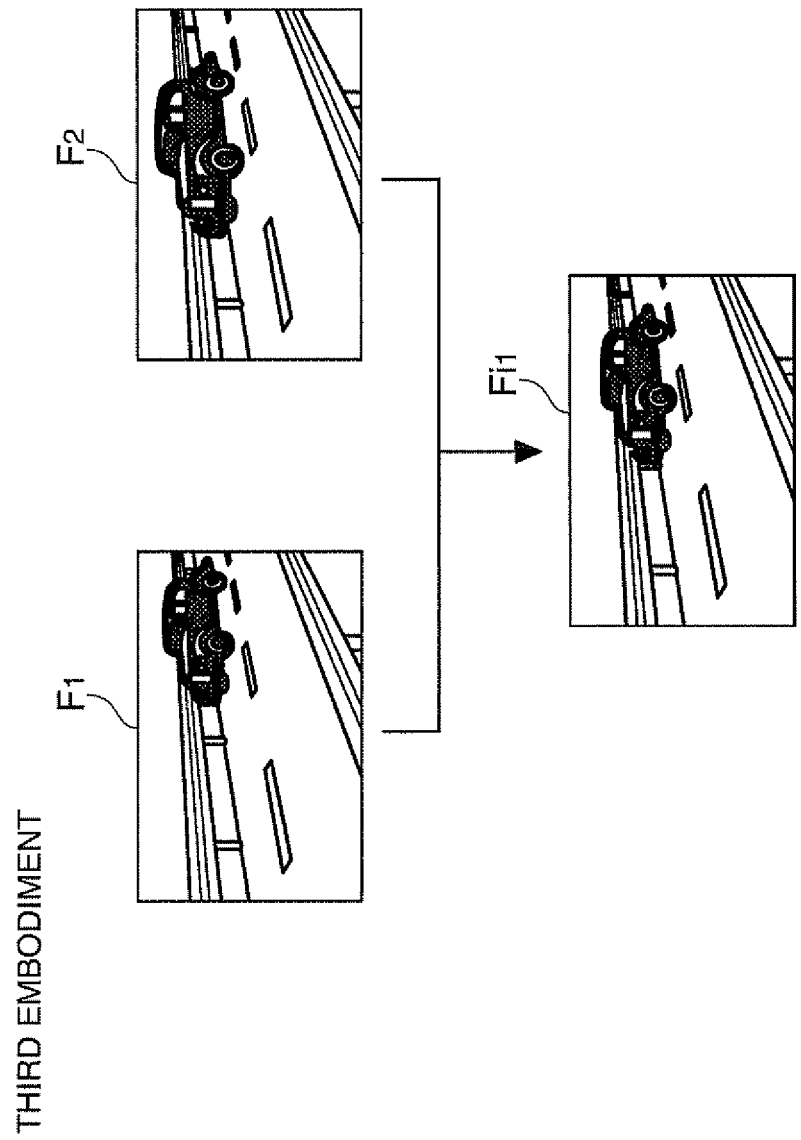
FIG. 15 is a diagram for explaining generation of a predicted frame image according to the third embodiment.

FIG. 15 is a diagram for specifically explaining the predicted frame image $Fi_n$. First and second frame images $F_1$ and $F_2$ are continuous frame images representing a moving image of a running vehicle. Positions of the vehicle are different in the first and second frame images $F_1$ and $F_2$. In this case, an image in which the vehicle is present in a position in the middle of the positions of the vehicle shown in the first and second frame images $F_1$ and $F_2$ is inserted as a predicted frame image $Fi_1$. Consequently, an observer of a display image can feel a motion represented by the moving image smoother. As a method of generating the predicted frame image $Fi_n$, an arbitrary method such as a method of predicting an intermediate position of a moving object using a motion vector of the moving object can be adopted.

The predicted-frame generating unit 54 (FIG. 14) transmits the predicted frame image signal $FSi_n$ to the luminance detecting unit 52 together with the frame image signal $FS_n$. The luminance detecting unit 52 calculates, from the frame image signal $FS_n$ and the predicted frame image signal $FSi_n$, average luminance levels of entire frame images $F_n$ and $Fi_n$ represented by the frame image signal $FS_n$ and the predicted frame image signal $FSi_n$, respectively, and further calculates an average of the average luminance levels of both the images.

The modulation-signal generating unit 50B transmits a request for transmission of the random noise signal $RNS_m$ to the random-noise-signal generating unit 60 (FIG. 12) together with the average. The random-noise-signal generating unit 60 transmits the random noise signal $RNS_m$ representing the random noise image $RN_m$ having an aperture ratio corresponding to the received average of the average luminance levels to the modulation-signal generating unit 50B. As in the second embodiment, the modulation-signal generating unit 50B determines an aperture ratio of the random noise image $RN_m$ by multiplying the average of the average luminance levels with the maximum aperture ratio (about 80%) of the random noise image $RN_m$. However, as in the first embodiment, the aperture ratio of the random noise image $RN_m$ may be fixed.

The modulation-signal generating unit 50B (FIG. 14) generates the frame image modulation signal $FM_n$ and a predicted frame image modulation signal $FMi_n$ from the frame image signal $FS_n$ and the predicted frame image signal $FSi_n$ and transmits the frame image modulation signal $FM_n$ and the predicted frame image modulation signal $FMi_n$ to the liquid crystal panels 4R, 4G, and 4B as the modulation signal MS. The modulation-signal generating unit 503 subsequently generates the random noise modulation signal $RNM_m$ from the random noise signal $RNS_m$ and transmits the random noise modulation signal $RNM_m$ to the liquid crystal panels 4R, 4G, and 4B as the modulation signal MS.

Figure 16:
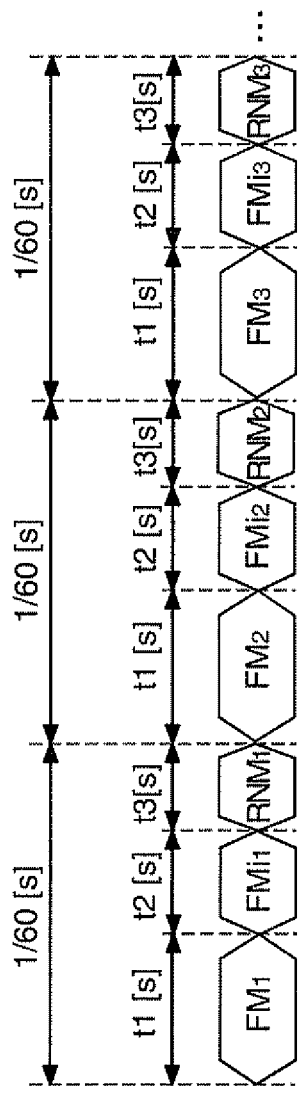
FIG. 16 is a diagram for explaining an example of a timing chart for a modulation signal according to the third embodiment.

FIG. 16 is a timing chart for the modulation signal MS transmitted to the liquid crystal panels 4R, 4G, and 4B. The modulation-signal generating unit 50B adjusts display times by the predicted frame image modulation signal $FMi_n$ and the random noise modulation signal $RNM_m$ such that an update period for the frame images $F_n$ is maintained at 1/60 second. Specifically, when the display time by the frame image modulation signal $FM_n$ is represented as t1 seconds, the display time by the predicted frame image modulation signal $FMi_n$ is represented as t2 seconds, and the display time by the random noise modulation signal $RNM_m$ is represented as t3 seconds, the display times t1, t2, and t3 are set such that a sum of the display times t1, t2, and t3 is about 1/60 second. In this case, the predicted frame image $Fi_n$ is generated by predicting an image after the elapse of t1 seconds from display timing of each of the frame images $F_n$.

Figure 17:
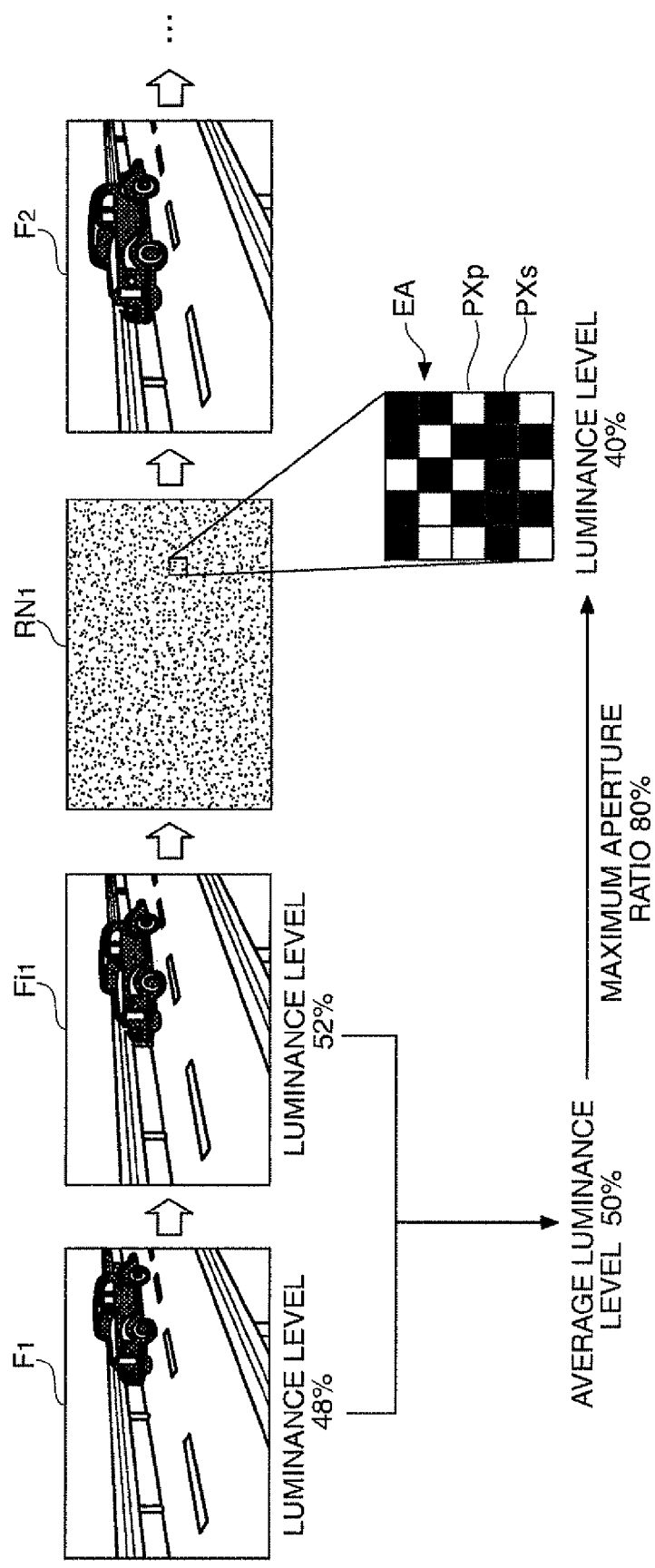
FIG. 17 is a schematic diagram for explaining display images shown in time series according to the third embodiment.

FIG. 17 is a schematic diagram of display images shown in time series, which are displayed on the projection screen 200 (FIG. 1) by the image display apparatus according to the third embodiment. On the projection screen 200, the first predicted frame image $Fi_1$ generated from the first and second frame images $F_1$ and $F_2$ is displayed following the first frame image $F_1$. After the random noise image $RN_1$ is displayed, the second frame image $F_2$ is displayed. Thereafter, in the same manner, images are repeatedly updated and displayed in order of the frame image $F_n$, the predicted frame image $Fi_n$, and the random noise image $RN_m$.

For example, when it is assumed that an average luminance level of the first frame image $F_1$ is about 48% and an average luminance level of the first predicted frame image $Fi_1$ is about 52%, an average of the average luminance levels of the frame images $F_1$ and the first predicted frame image $Fi_1$ is about 50%. Therefore, an aperture ratio of the random noise image $RN_1$ to be displayed following the first predicted frame image $Fi_1$ is about 40%, which is calculated by multiplying the received average of the average luminance levels with the maximum aperture ratio of about 80%. In the figure, a partial area EA including arbitrary twenty-five pixels of the random noise image $RN_1$ is enlarged and shown in the figure. However, ten light transmitting pixels PXp are included in the twenty-five pixels of the area EA.

As explained above, with the configuration of the third embodiment, even when predicted frame images are inserted, as in the first to third embodiments, it is possible to reduce the influence of a speckle pattern recognized by the observer of the display image on the display image. Even when plural frame images are displayed before a random noise image, the random noise image having an aperture ratio reflecting luminance levels of the frame images is inserted. Therefore, it is possible to prevent a luminance level of the display image from suddenly changing.

Fourth Embodiment

FIG. 18A is a schematic diagram of the random noise image $RN_m$ used for a fourth embodiment of the invention. FIG. 18B is a diagram of a two-dimensional Fourier pattern FP obtained by subjecting the random noise image $RN_m$ shown in FIG. 18A to spatial frequency analysis. In FIG. 18B, with the center of the image set to 0 frequency, an ordinate direction indicates a vertical frequency and an abscissa direction indicates a horizontal frequency. A whiter area indicates that intensity at a frequency corresponding thereto is larger. A configuration of an image display apparatus according to the fourth embodiment is the same as that in the third embodiment (FIGS. 1 and 14).

In order to reduce the influence of a speckle pattern recognized by an observer of a display image on the display image, it is preferable to cause complex amplitude to more substantially fluctuate on a focal plane by inserting the random noise image $RN_m$. In order to cause the complex amplitude to more substantially fluctuate, it is preferable that the random noise image $RN_m$ has higher-frequency components. In other words, as in the two-dimensional Fourier pattern FP, it is preferable that the intensity of an outer peripheral area (a high-frequency band) thereof is larger than that in a center area (a low-frequency band near 0 frequency) thereof. It is possible to generate the random noise image $RN_m$ by subjecting a two-dimensional Fourier pattern having a frequency intensity distribution like that of the two-dimensional Fourier pattern FP to inverse Fourier transform.

As explained above, in the image display apparatus according to the fourth embodiment, the random-noise-signal generating unit 60 (FIG. 12) transmits the random noise signal $RNS_m$ representing the random noise image $RN_m$ having the intensity of high-frequency components larger than that of low-frequency components to the modulation-signal generating unit 50B. Therefore, it is possible to further reduce the influence of the speckle pattern recognized by the observer of the display image on the display image.

Fifth Embodiment

Figure 19A:
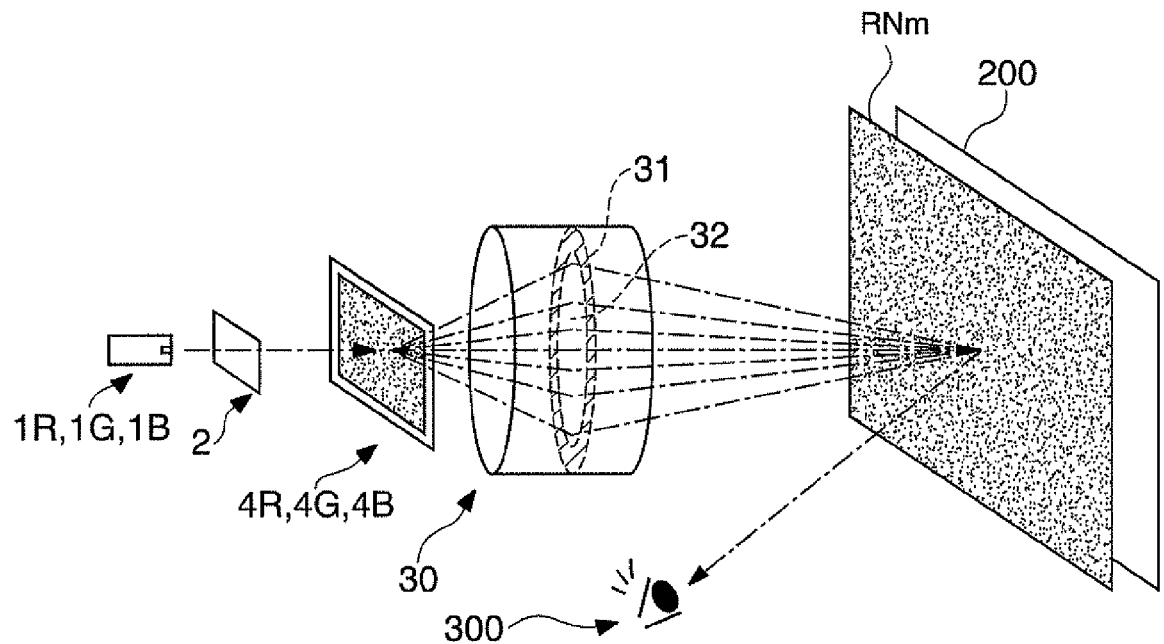
FIG. 19A is a schematic diagram of an optical path of an image display apparatus according to a fifth embodiment of the invention.

FIG. 19A is a schematic diagram of an optical path of a laser beam of an image display apparatus according to a fifth embodiment of the invention. FIG. 19A is substantially the same as FIG. 8 except that an aperture stop 31 is provided in the projection lens 30 and that the random noise images $RN_m$ are displayed on the pixel area PA of the liquid crystal panels 4R, 4G, and 4B and the projection screen 200. Other components of the image display apparatus according to the fifth embodiment is the same as those in the fourth embodiment (FIGS. 1 and 14).

In image light representing the random noise images $RN_m$, the two-dimensional Fourier pattern shown in FIG. 18B appears on a section formed by a plane parallel to the liquid crystal panels 4R 4G, and 4B in the position of the aperture stop 31 of the projection lens 30. Therefore, it is preferable that an opening 32 of the aperture stop 31 is opened to a degree not blocking the high-frequency components (wide angle components) of the random noise images $RN_m$. In this case, an outer circumference of the opening 32 of the aperture stop 31 substantially coincides with an outer circumference of a bright area shown in FIG. 18B.

Figure 19B:
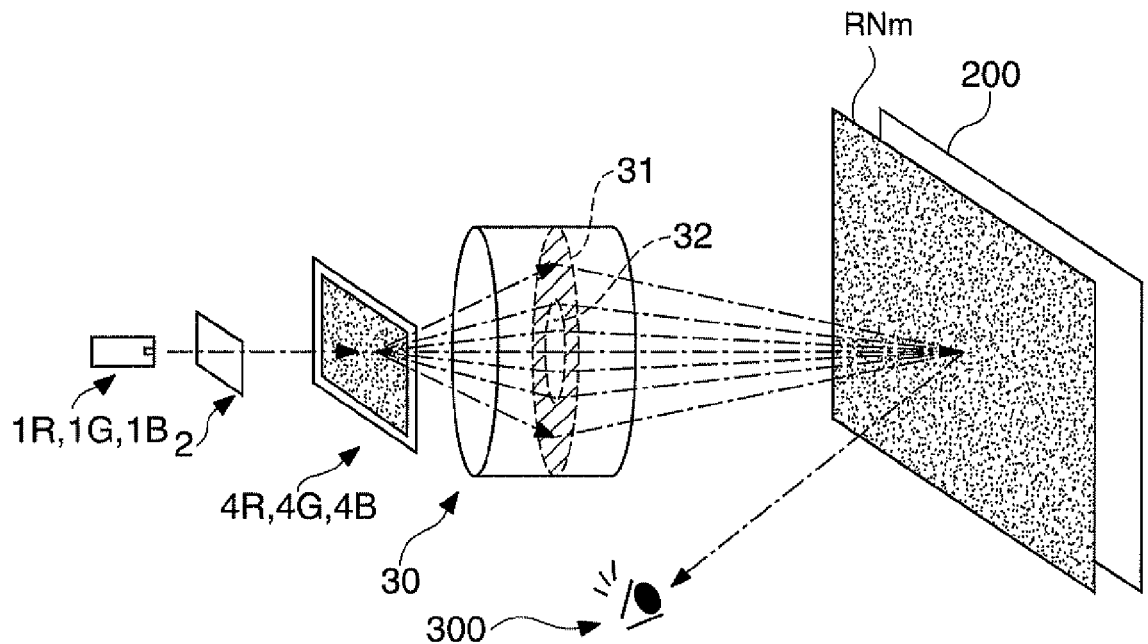
FIG. 19B is a schematic diagram of a comparative example of the optical path.

FIG. 19B is a schematic diagram of an optical path of a laser beam of an image display apparatus according to a comparative example of the fifth embodiment. FIG. 19B is substantially the same as FIG. 19A except that the opening 32 of the aperture stop 31 is smaller than that shown in FIG. 19A. In the case of this comparative example, the high-frequency components of the image light representing the random noise images $RN_m$ is blocked by the aperture stop 31 and does not reach the projection screen 200. In other words, since the high-frequency components of the random noise images RNm are blocked, the fluctuation in complex amplitude in the projection screen 200 due to the random noise image RNm is reduced.

Therefore, the image display apparatus according to the comparative example has the larger influence of the speckle pattern recognized by the observer of the display image on the display image.

As explained above, it is preferable that the aperture stop 31 of the projection lens 30 has size not blocking the high-frequency components of the random noise images RNm. For example, an F value of the aperture stop 31 may be set smaller than 2.0. Consequently, it is possible to further reduce the influence of the speckle pattern recognized by the observer of the display image on the display image.

Sixth Embodiment

Figure 20:
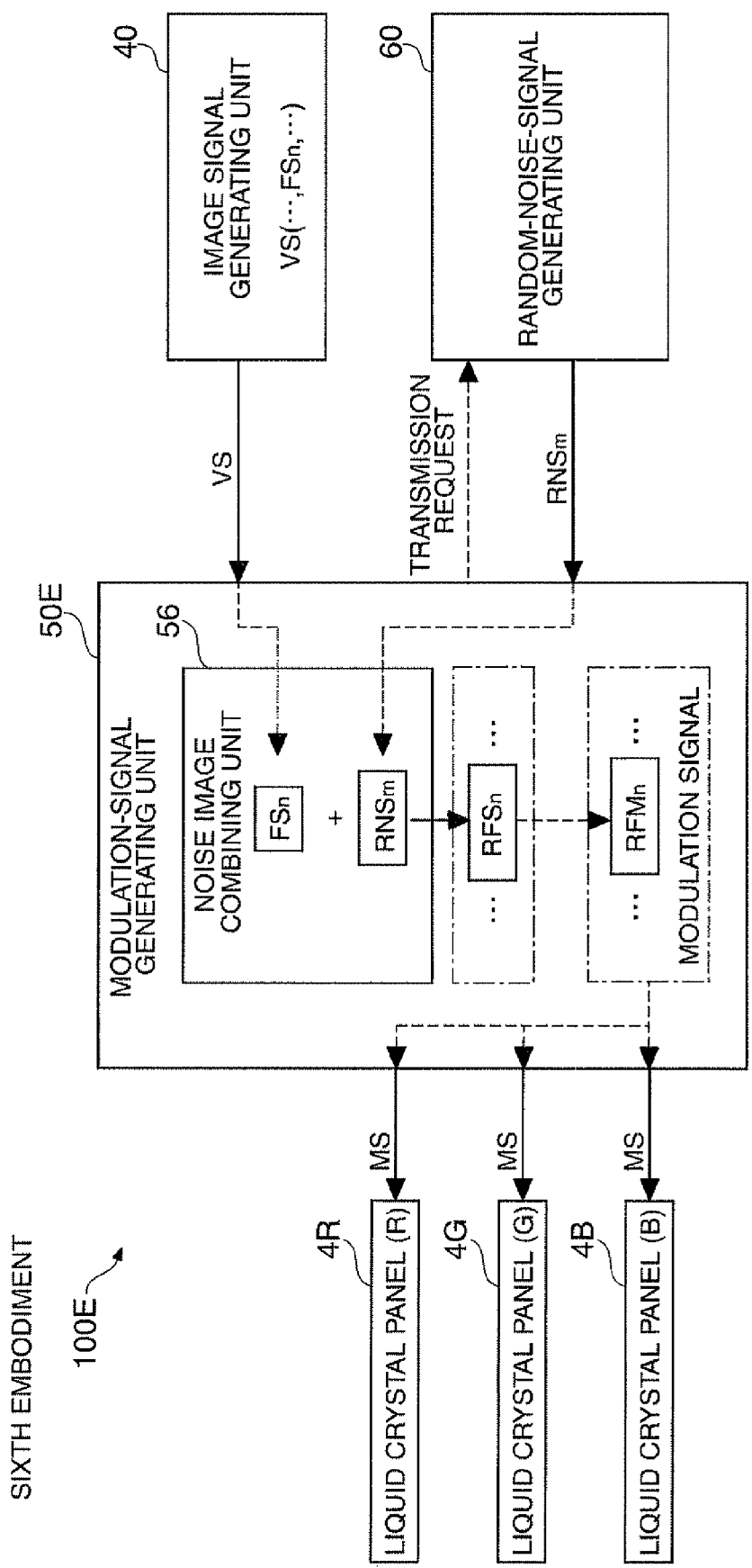
FIG. 20 is a schematic diagram of an internal configuration of an image display apparatus according to a sixth embodiment of the invention.

FIG. 20 is a schematic diagram of an internal configuration of an image display apparatus 100E according to a sixth embodiment of the invention. FIG. 20 is substantially the same as FIG. 14 except that a modulation-signal generating unit 50E is provided instead of the modulation-signal generating unit 50B. Other components of the image display apparatus 100E is the same as those in the fifth embodiment (FIG. 1).

The modulation-signal generating unit 50E includes a noise-image combining unit 56. Every time the modulation-signal generating unit 50E receives the frame image signal $FS_n$ included in the moving image signal VS from the image-signal generating unit 40, the modulation-signal generating unit 50E issues a request for transmission of the random noise signal $RNS_m$ to the random-noise-signal generating unit 60. The random-noise-signal generating unit 60 transmits the random noise signal $RNS_m$ representing the random noise image $RN_m$ different for each transmission request to the modulation-signal generating unit 50E.

The noise-image combining unit 56 of the modulation-signal generating unit 50E generates a random noise frame image signal $RFS_n$ obtained by combining the frame image signal $FS_n$ and the random noise image $RN_m$. An image represented by the random noise frame image signal $RFS_n$ is an image in which a random noise is inserted in the frame image $F_n$. The modulation-signal generating unit 50E generates, on the basis of the random noise frame image signal $RFS_n$, a random noise frame modulation signal $RFM_n$, which is a modulation signal of the random noise frame image signal $RFS_n$, and transmits the random noise frame modulation signal $RFM_n$ to the liquid crystal panels 4R, 4G, and 4B as the modulation signal MS.

Figure 21:
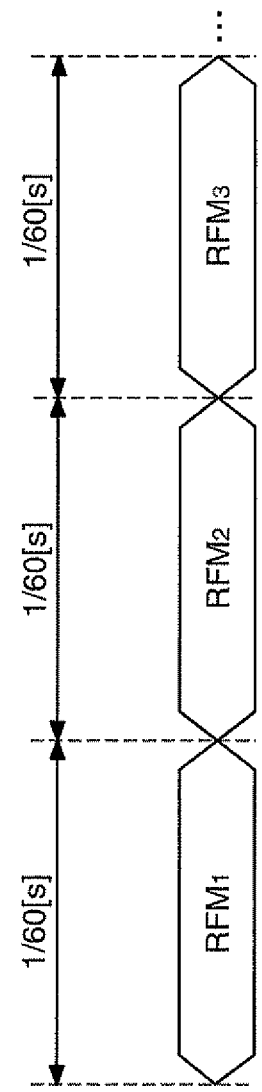
FIG. 21 is a diagram for explaining an example of a timing chart for a modulation signal according to the sixth embodiment.

FIG. 21 is a diagram for explaining an example of a timing chart for the modulation signal MS according to the sixth embodiment. The modulation-signal generating unit 50E transmits the random noise frame modulation signal $RFM_n$ such that a frame period is maintained at ¹⁄₆₀ second. Consequently, a frame image on which a random noise pattern is superimposed is updated and displayed on the projection screen 200 (FIG. 1) every ¹⁄₆₀ second.

With such a configuration, it is possible to cause complex amplitude on a focal plane to fluctuate according to a change in the inserted random noise pattern. It is also possible to prevent an observer of a display image from recognizing the influence of a speckle pattern on the display image. If the frame period of images is set to be equal to or smaller than ¹⁄₆₀, it is possible to prevent the observer of the display image from recognizing noise in frame images. When a predicted frame image is generated as in the third embodiment, noise images may be combined with an original frame image and the predicted frame image, respectively.

Modifications

The invention is not limited to the embodiments. It is possible to carry out the invention in various forms without departing from the spirit of the invention. For example, modifications explained below are possible.

Modification 1

A part of the components realized by hardware in the embodiments may be replaced with software. Conversely, a part of the components realized by software may be replaced with hardware. For example, a part of the functions of the modulation-signal generating unit 50 may be executed by the image-signal generating unit 40 and the random-noise-signal generating unit 60.

Modification 2

In the embodiments, the random-noise-signal generating unit 60 may generate, rather than the random noise signal $RNS_m$ representing the random noise image $RN_m$, a noise signal representing an image including noise that is not completely random.

Modification 3

In the embodiments, a binary image is used as the random noise image $RN_m$. However, the random noise image $RN_m$ may be a multi-value image having a halftone. The random noise image $RN_m$ may be obtained by combining noise patterns different for each of color components. In these cases, the aperture ratio in the embodiments may be interpreted as an average luminance level of the entire random noise image $RN_m$.

Modification 4

In the embodiments, the random noise image $RN_m$ is inserted for every display of each of the frame images $F_n$. However, the random noise image $RN_m$ may be periodically inserted at a period different from the display of each of the frame images $F_n$ as long as a display start period for each of the frame images $F_n$ and the predicted frame image is maintained at a substantially fixed period.

Modification 5

In the embodiments, each of the image-light emitting devices 10R, 10G, and 10B includes the liquid crystal panels 4R, 4G, and 4B (FIGS. 2 and 3). However, in stead of the liquid crystal panels 4R, 4G, and 4B, other light modulating devices such as Digital Micromirror Device (a trademark of Texas Instruments Inc.) may be provided.

Modification 6

In the second and third embodiments, the aperture ratio of the random noise image $RN_m$ is determined by multiplying the value of the luminance level received by the random-noise-signal generating unit 60 with the maximum aperture ratio. However, the aperture ratio may be determined by other methods. The aperture ratio of the random noise image $RN_m$ only has to be determined in association with the luminance level received by the random-noise-signal generating unit 60.

Modification 7

In the third embodiment, only one frame of the predicted frame image $Fi_n$ is generated and inserted. However, plural predicted frame images may be generated and inserted. In the sixth embodiment, all the frame images $F_n$ are replaced with random noise frame images $RF_n$. However, only a part of the frame images $F_n$ may be replaced with the random noise frame images $RF_n$.

The entire disclosure of Japanese Patent Application No. 2008-43951, filed Feb. 26, 2008 is expressly incorporated by reference herein.

What is claimed is:

1. An image display apparatus employing a laser beam source, the image display apparatus comprising:
    a light modulating unit that modulates a laser beam emitted from the laser beam source into image light representing an image; and
    a driving-signal generating unit that generates, on the basis of an image signal of a frame image updated at a fixed first period, a driving signal configured to display the frame image, wherein
    the driving-signal generating unit periodically inserts a noise-image driving signal, configured to display a noise image containing noise recognizable by a user, into the driving signal while maintaining timing for updating display of the frame image at the first period, and
    the noise image periodically inserted in the driving signal is a random noise image that is a uniform image in which a specific pattern does not appear when a plurality of the noise images are integrated in a time direction.

2. The image display apparatus according to claim 1, wherein the driving-signal generating unit generates, at the first period, a frame-image driving signal configured to display the frame image as a non-noise frame image not including the noise image and generates, at a fixed second period, the noise-image driving signal configured to display the noise image.

3. The image display apparatus according to claim 2, wherein the driving-signal generating unit further generates, as the non-noise frame image not including the noise image, a predicted frame image predicted as an image present in the middle of each pair of the frame images arranged in time series order and generates, at the first period, a predicted-frame-image driving signal configured to display the predicted frame image.

4. The image display apparatus according to claim 2, wherein the second period is equal to the first period.

5. The image display apparatus according to claim 1, wherein all the noise images displayed at least within one second are different.

6. The image display apparatus according to claim 1, wherein the driving-signal generating unit generates, at the first period, a frame-image-with-noise driving signal configured to display a frame image with noise obtained by combining the frame image and the noise image.

7. The image display apparatus according to claim 6, wherein the driving-signal generating unit further generates a predicted frame image predicted as an image present in the middle of each pair of the frame images arranged in time series order, generates a predicted frame image with noise obtained by combining the predicted frame image with the noise image, and generates, at the first period, a predicted-frame-image-with-noise driving signal configured to display the predicted frame image with noise.

8. An image display apparatus employing a laser beam source, the image display apparatus comprising:
    a light modulating unit that modulates a laser beam emitted from the laser beam source into image light representing an image; and a driving-signal generating unit that generates, on the basis of an image signal of a frame image updated at a fixed first period, a driving signal configured to display the frame image, wherein the driving-signal generating unit periodically inserts a noise-image driving signal, configured to display a noise image containing noise recognizable by a user, into the driving signal while maintaining timing for updating display of the frame image at the first period, the driving-signal generating unit generates, at the first period, a frame-image driving signal configured to display the frame image as a non-noise frame image not including the noise image and generates, at a fixed second period, the noise-image driving signal configured to display the noise image, and an average luminance level of the noise image is set in association with an average luminance level of a predetermined number of the non-noise frame images displayed before the noise image.

9. An image display apparatus employing a laser beam source, the image display apparatus comprising:

a light modulating unit that modulates a laser beam emitted from the laser beam source into image light representing an image; and a driving-signal generating unit that generates, on the basis of an image signal of a frame image updated at a fixed first period, a driving signal configured to display the frame image, wherein the driving-signal generating unit periodically inserts a noise-image driving signal, configured to display a noise image containing noise recognizable by a user, into the driving signal while maintaining timing for updating display of the frame image at the first period, and the noise image is an image that has, when subjected to Fourier transform, amplitude intensity in a first frequency band near 0 of a frequency lower than amplitude intensity in a second frequency band further on a high-frequency side than the first frequency band.

10. An image display method for modulating a laser beam to display a frame image on a display screen, the image display method comprising modulating, while maintaining timing for updating display of the frame image at a fixed first period, the laser beam such that a noise image consisting of noise recognizable by a user, generated by a noise-image driving signal, is periodically displayed on the display screen.

11. An image display apparatus employing a laser beam source, the image display apparatus comprising:

a light modulating unit that modulates a laser beam emitted from the laser beam source into image light representing an image; and a driving-signal generating unit that generates, on the basis of an image signal of a frame image updated at a fixed first period, a driving signal configured to display the frame image, wherein the driving-signal generating unit periodically inserts a noise-image driving signal, configured to display a noise image consisting of noise recognizable by a user, into the driving signal while maintaining timing for updating display of the frame image at the first period.

* * * * *